(12) United States Patent
Nakagawa et al.

(10) Patent No.: US 8,074,090 B2
(45) Date of Patent: Dec. 6, 2011

(54) STORAGE SYSTEM INCLUDING PLURALITY OF STORAGE APPARATUSES

(75) Inventors: Hirotaka Nakagawa, Fujisawa (JP);
Masayasu Asano, Yokohama (JP);
Yuichi Taguchi, Sagamihara (JP);
Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1157 days.

(21) Appl. No.: 11/510,832

(22) Filed: Aug. 24, 2006

(65) Prior Publication Data

US 2008/0010234 A1   Jan. 10, 2008

(30) Foreign Application Priority Data

Jul. 7, 2006   (JP) .................................. 2006-187993

(51) Int. Cl.
*G06F 1/26* (2006.01)
*G06F 1/32* (2006.01)

(52) U.S. Cl. ........ 713/320; 713/300; 713/321; 713/323; 713/324; 711/100; 711/114

(58) Field of Classification Search .................. 713/320, 713/300, 321, 323, 324; 711/100, 114
See application file for complete search history.

(56) References Cited

U.S. PATENT DOCUMENTS

| 5,629,694 | A | 5/1997 | Simon et al. |
| 6,583,947 | B1 | 6/2003 | Hakamata et al. |
| 7,426,646 | B2 * | 9/2008 | Fujimoto ...................... 713/300 |
| 7,434,097 | B2 * | 10/2008 | Guha et al. ........................ 714/7 |
| 2003/0145166 | A1 | 7/2003 | Miwa et al. |
| 2003/0191915 | A1 * | 10/2003 | Saxena et al. .................. 711/160 |
| 2004/0111596 | A1 | 6/2004 | Rawson, III |
| 2004/0236908 | A1 | 11/2004 | Suzuki et al. |
| 2006/0239097 | A1 * | 10/2006 | Nakai et al. .................... 365/222 |

FOREIGN PATENT DOCUMENTS

| JP | 8272497 A | 10/1996 |
| JP | 09282057 A | 10/1997 |
| JP | 2000-293314 | 10/2000 |
| JP | 200193220 A | 4/2001 |
| JP | 2003223289 A | 8/2003 |
| JP | 2004192612 A | 7/2004 |
| JP | 2004348876 A | 12/2004 |

OTHER PUBLICATIONS

Japanese Office Action corresponding to Japanese Patent Application No. 2006-187993, mailed Jul. 5, 2011. English language translation.

* cited by examiner

*Primary Examiner* — Thomas Lee
*Assistant Examiner* — Michael J Brown
(74) *Attorney, Agent, or Firm* — Sughrue Mion, PLLC

(57) ABSTRACT

Conventionally, no consideration was given to the control of the main power supply circuit in a storage apparatus. Thus, unnecessary electric power will be consumed because it is not possible to inhibit the power consumption of the main power supply circuit of the storage apparatus. With this storage system having a plurality of storage apparatuses, a storage apparatus internally has a power supply control program for controlling the respective components and the main power supply circuit, and the power supply control command program provided to the management computer migrates a storage extent to be used for business to another storage apparatus based on the operation schedule of business to use the storage extent of the storage apparatus, and commands the power supply control of the main power supply circuit in the storage apparatuses and the respective components.

17 Claims, 39 Drawing Sheets

FIG.7

| VOLUME ID | CAPACITY | ALLOCATION DESTINATION | CONTROLLER ID | ARRAY GROUP ID |
|---|---|---|---|---|
| VOL001 | 50GB | H1 | CONTROLLER 0 | AG1 |
| VOL002 | 150GB | H2 | CONTROLLER 0 | AG2 |
| UNALLOCATED DESTINATION | 50GB | - | - | - |

| DISK ID | CAPACITY | ARRAY GROUP |
|---|---|---|
| DISK001 | 50GB | AG1 |
| DISK002 | 50GB | AG1 |
| DISK003 | 50GB | - |
| DISK004 | 150GB | AG2 |
| DISK005 | 150GB | AG2 |

| STORAGE APPARATUS ID (42510) | CAPACITY OF UNALLOCATED STORAGE EXTENT (42520) |
|---|---|
| ST1 | 50GB |
| ST2 | 210GB |
| ST3 | 100GB |
| ST4 | 150GB |

| APPARATUS ID (42610) | INTERNAL APPARATUS VOLUME ID (42620) | CAPACITY (42630) | ALLOCATION DESTINATION (42640) | CONTROLLER ID (42650) | ARRAY GROUP (42660) |
|---|---|---|---|---|---|
| ST1 | VOL001 | 50GB | H1 | Ctrl0 | AG1 |
| ST1 | VOL002 | 150GB | H1 | Ctrl0 | AG2 |
| ST2 | VOL001 | 20GB | H2 | Ctrl0 | AG1 |
| ST2 | VOL002 | 20GB | H3 | Ctrl0 | AG3 |
| ST3 | VOL001 | 100GB | H2 | Ctrl0 | AG1 |
| ST3 | VOL002 | 50GB | H3 | Ctrl0 | AG2 |
| ST4 | VOL001 | 100GB | H4 | Ctrl0 | AG1 |

FIG.15

BUSINESS OPERATION SCHEDULE INPUT SCREEN — H1000

| BUSINESS ID | BUSINESS A | ~ H1005 |
| DATE | 2006/01/03 | ~ H1010 |
| OPERATION SCHEDULE | OPERATE / OPERATE STOP | ~ H1015 |

[REGISTER] H1020  [CANCEL] H1025

FIG.16

VOLUME ALLOCATION SCREEN — H2000

| BUSINESS ID | BUSINESS A | ~ H2050 |
| ALLOCATION DESTINATION | H1 | ~ H2100 |
| CAPACITY | 100GB | ~ H2150 |
| VOLUME ID | VOL1 | ~ H2200 |

[REGISTER] H2250  [CANCEL] H2300

| | ST1 | ST2 | ST3 | ST4 |
|---|---|---|---|---|
| ACCESSED VOLUME LIST | | VOL3 | VOL5 | VOL7 |
| | | | | |
| | | | | |
| UNACCESSED VOLUME LIST | VOL1 | VOL4 | VOL6 | |
| | VOL2 | | | |
| | | | | |
| UNALLOCATED STORAGE EXTENT | 50GB | 210GB | 100GB | 150GB |
| MAIN POWER SUPPLY CIRCUIT | ON | ON | ON | ON |

| | ST1 | ST2 | ST3 | ST4 |
|---|---|---|---|---|
| ACCESSED VOLUME LIST | | VOL3 | VOL5 | VOL7 |
| | | | | |
| | | | | |
| UNACCESSED VOLUME LIST | VOL1 | VOL4 | VOL6 | |
| | VOL2 | | | |
| | | | | |
| UNALLOCATED STORAGE EXTENT | 50GB | 210GB | 100GB | 150GB |
| MAIN POWER SUPPLY CIRCUIT | OFF | ON | ON | ON |

| MIGRATION DESTINATION APPARATUS ID | TOTAL CAPACITY OF ACCESSED VOLUMES | TOTAL CAPACITY OF UNACCESSED VOLUMES | UNALLOCATED STORAGE EXTENT CAPACITY | MIGRATION MEANS |
|---|---|---|---|---|
| ST3 | 100GB | 20GB | 100GB | COPY |
| ST4 | 100GB | 50GB | 150GB | COPY |

|  | ST1 | ST2 | ST3 | ST4 |
|---|---|---|---|---|
| ACCESSED VOLUME LIST |  |  | VOL5 | VOL7 |
|  |  |  |  | VOL3 |
|  |  |  |  |  |
| UNACCESSED VOLUME LIST | VOL1 | VOL4 | VOL6 |  |
|  | VOL2 |  |  |  |
|  |  |  |  |  |
| UNALLOCATED STORAGE EXTENT | 50GB | 230GB | 100GB | 130GB |
| MAIN POWER SUPPLY CIRCUIT | OFF | OFF | ON | ON |

| MIGRATION DESTINATION APPARATUS ID | TOTAL CAPACITY OF ACCESSED VOLUMES | TOTAL CAPACITY OF UNACCESSED VOLUMES | UNALLOCATED STORAGE EXTENT CAPACITY | MIGRATION MEANS |
|---|---|---|---|---|
| ST4 | 102GB | 50GB | 130GB | COPY |

| | ST1 | ST2 | ST3 | ST4 |
|---|---|---|---|---|
| ACCESSED VOLUME LIST | | | | VOL7 |
| | | | | VOL3 |
| | | | | VOL5 |
| UNACCESSED VOLUME LIST | VOL1 | VOL4 | VOL6 | |
| | VOL2 | | | |
| | | | | |
| UNALLOCATED STORAGE EXTENT | 50GB | 230GB | 200GB | 30GB |
| MAIN POWER SUPPLY CIRCUIT | OFF | OFF | OFF | ON |

| COMPONENT ID | POWER SUPPLY STATUS |
|---|---|
| DISK001 | ON |
| DISK002 | ON |
| DISK003 | ON |
| DISK004 | ON |
| DISK005 | ON |
| DISK006 | ON |
| DISK007 | ON |
| DISK008 | ON |
| CONTROLLER 0 | ON |
| NETWORK I/F 0 | ON |
| NETWORK I/F 1 | ON |
| MAIN POWER SUPPLY CIRCUIT | ON |
| STANDBY POWER SUPPLY CIRCUIT | ON |

FIG.32A

| VIRTUAL VOLUME ID | CAPACITY | ALLOCATION DESTINATION | CONTROLLER ID | EXTERNAL CONNECTION PORT ID | REAL STORAGE INFORMATION | |
|---|---|---|---|---|---|---|
| | | | | | APPARATUS ID | INTERNAL APPARATUS VOLUME ID |
| V1-VOL1 | 50GB | H1 | Ctrl0 | Port0 | ST1 | VOL001 |
| V1-VOL2 | 150GB | H1 | Ctrl0 | Port0 | ST1 | VOL002 |
| V1-VOL3 | 20GB | H2 | Ctrl0 | Port1 | ST2 | VOL001 |
| V1-VOL4 | 20GB | H3 | Ctrl0 | Port1 | ST2 | VOL002 |

FIG.32B

| VIRTUAL VOLUME ID | CAPACITY | ALLOCATION DESTINATION | CONTROLLER ID | EXTERNAL CONNECTION PORT ID | REAL STORAGE INFORMATION | |
|---|---|---|---|---|---|---|
| | | | | | APPARATUS ID | INTERNAL APPARATUS VOLUME ID |
| V2-VOL1 | 100GB | H2 | Ctrl0 | Port0 | ST3 | VOL002 |
| V2-VOL2 | 50GB | H3 | Ctrl0 | Port0 | ST3 | VOL002 |
| V2-VOL3 | 100GB | H4 | Ctrl0 | Port1 | ST4 | VOL001 |

FIG.33

| COMPONENT ID | POWER SUPPLY STATUS |
|---|---|
| Port 0 | ON |
| Port 1 | ON |
| CONTROLLER 0 | ON |
| NETWORK I/F 0 | ON |
| NETWORK I/F 1 | ON |
| MAIN POWER SUPPLY CIRCUIT | ON |
| STANDBY POWER SUPPLY CIRCUIT | ON |

35501 — COMPONENT ID
35502 — POWER SUPPLY STATUS
35500

FIG.34

| STORAGE APPARATUS ID | TYPE | APPARATUS IDENTIFYING INFORMATION | IP ADDRESS |
|---|---|---|---|
| ST1 | STORAGE | VENDER A, MODEL A, SERIAL NUMBER AD1 | 12.12.12.12 |
| ST2 | STORAGE | VENDER B, MODEL A, SERIAL NUMBER BG2 | 12.12.13.10 |
| ST3 | STORAGE | VENDER C, MODEL C, SERIAL NUMBER 451 | 12.12.15.145 |
| ST4 | STORAGE | VENDER C, MODEL D, SERIAL NUMBER FF5 | 12.12.15.56 |
| SC1 | STORAGE CONTROLLER | VENDER A, MODEL D, SERIAL NUMBER 1155 | 12.12.11.11 |

| APPARATUS ID | INTERNAL APPARATUS VOLUME ID | CAPACITY | ALLOCATION DESTINATION | CONTROLLER ID | ARRAY GROUP |
|---|---|---|---|---|---|
| ST1 | VOL001 | 50GB | SC1 | Ctrl0 | AG1 |
| ST1 | VOL002 | 150GB | SC1 | Ctrl0 | AG2 |
| ST2 | VOL001 | 20GB | SC1 | Ctrl0 | AG1 |
| ST2 | VOL002 | 20GB | SC1 | Ctrl0 | AG3 |
| ST3 | VOL001 | 100GB | SC2 | Ctrl0 | AG1 |
| ST3 | VOL002 | 50GB | SC2 | Ctrl0 | AG2 |
| ST4 | VOL001 | 100GB | SC2 | Ctrl0 | AG1 |
| SC1 | V1-VOL1 | 50GB | H1 | Ctrl0 | Port0 |
| SC1 | V1-VOL2 | 150GB | H1 | Ctrl0 | Port0 |
| SC1 | V1-VOL3 | 20GB | H2 | Ctrl0 | Port1 |
| SC1 | V1-VOL4 | 20GB | H3 | Ctrl0 | Port1 |
| SC2 | V2-VOL1 | 100GB | H2 | Ctrl0 | Port0 |
| SC2 | V2-VOL2 | 50GB | H3 | Ctrl0 | Port0 |
| SC2 | V2-VOL3 | 100GB | H4 | Ctrl0 | Port1 |

FIG.36

| GLOBAL VOLUME ID (42710) | BUSINESS ID (42720) | VIRTUAL VOLUME INFORMATION (42730) ||
|---|---|---|---|
| | | STORAGE CONTROLLER ID (42731) | VIRTUAL VOLUME ID (42732) |
| VOL1 | BUSINESS A | SC1 | V1-VOL1 |
| VOL2 | BUSINESS A | SC1 | V1-VOL2 |
| VOL3 | BUSINESS B | SC1 | V1-VOL3 |
| VOL4 | BUSINESS C | SC1 | V1-VOL4 |
| VOL5 | BUSINESS B | SC2 | V2-VOL1 |
| VOL6 | BUSINESS C | SC2 | V2-VOL2 |
| VOL7 | BUSINESS D | SC2 | V2-VOL3 |

| APPARATUS ID (42910) | VIRTUAL VOLUME ID (42920) | REAL STORAGE INFORMATION (42930) ||
|---|---|---|---|
| | | APPARATUS ID (42931) | INTERNAL APPARATUS VOLUME ID (42932) |
| SC1 | V1-VOL1 | ST1 | VOL001 |
| SC1 | V1-VOL2 | ST1 | VOL002 |
| SC1 | V1-VOL3 | ST2 | VOL001 |
| SC1 | V1-VOL4 | ST2 | VOL002 |
| SC2 | V2-VOL1 | ST3 | VOL001 |
| SC2 | V2-VOL2 | ST3 | VOL002 |
| SC2 | V2-VOL3 | ST4 | VOL001 |

|  | VIRTUAL VOLUME ID | REAL STORAGE INFORMATION | | GLOBAL ID | ACCESS STATUS | |
|---|---|---|---|---|---|---|
|  |  | APPARATUS ID | INTERNAL APPARATUS VOLUME ID |  | YES | NO |
| SC1 | V1-VOL1 | ST1 | VOL001 | VOL1 |  | O |
|  | V1-VOL2 | ST1 | VOL002 | VOL2 |  | O |
|  | V1-VOL3 | ST2 | VOL001 | VOL3 | O |  |
|  | V1-VOL4 | ST2 | VOL002 | VOL4 |  | O |
| SC2 | V2-VOL1 | ST3 | VOL001 | VOL5 | O |  |
|  | V2-VOL2 | ST3 | VOL002 | VOL6 |  | O |
|  | V2-VOL3 | ST4 | VOL001 | VOL7 | O |  |

FIG.45B

| APPARATUS ID | MAIN POWER SUPPLY CIRCUIT |
|---|---|
| ST1 | ON |
| ST2 | ON |
| ST3 | ON |
| ST4 | ON |
| SC1 | ON |
| SC2 | ON |

FIG.46A

| | VIRTUAL VOLUME ID | REAL STORAGE INFORMATION | | GLOBAL ID | ACCESS STATUS | |
|---|---|---|---|---|---|---|
| | | APPARATUS ID | INTERNAL APPARATUS VOLUME ID | | YES | NO |
| SC1 | V1-VOL1 | ST1 | VOL001 | VOL1 | | ○ |
| | V1-VOL2 | ST1 | VOL002 | VOL2 | | ○ |
| | V1-VOL3 | ST4 | VOL002 | VOL3 | ○ | |
| | V1-VOL4 | ST2 | VOL002 | VOL4 | | ○ |
| SC2 | V2-VOL1 | ST4 | VOL003 | VOL5 | ○ | |
| | V2-VOL2 | ST3 | VOL002 | VOL6 | | ○ |
| | V2-VOL3 | ST4 | VOL001 | VOL7 | ○ | |

FIG.46B

| APPARATUS ID | MAIN POWER SUPPLY CIRCUIT |
|---|---|
| ST1 | OFF |
| ST2 | OFF |
| ST3 | OFF |
| ST4 | ON |
| SC1 | ON |
| SC2 | ON |

FIG.47A

VIRTUAL VOLUME CONFIGURATION MANAGEMENT TABLE OF STORAGE CONTROLLER SC1

35300

| VIRTUAL VOLUME ID | CAPACITY | ALLOCATION DESTINATION | CONTROLLER ID | EXTERNAL CONNECTION PORT ID | REAL STORAGE INFORMATION | |
|---|---|---|---|---|---|---|
| | | | | | APPARATUS ID | INTERNAL APPARATUS VOLUME ID |
| V1-VOL1 | 50GB | H1 | Ctrl0 | Port0 | ST1 | VOL001 |
| V1-VOL2 | 150GB | H1 | Ctrl0 | Port0 | ST1 | VOL002 |
| V1-VOL3 | 20GB | H2 | Ctrl0 | Port1 | ST4 | VOL002 |
| V1-VOL4 | 20GB | H3 | Ctrl0 | Port1 | ST2 | VOL002 |

FIG.47B

POWER SUPPLY MANAGEMENT TABLE OF STORAGE CONTROLLER SC1

35500

| COMPONENT ID | POWER SUPPLY STATUS |
|---|---|
| Port0 | ON |
| Port1 | ON |
| CONTROLLER 0 | ON |
| NETWORK I/F 0 | ON |
| NETWORK I/F 1 | ON |
| MAIN POWER SUPPLY CIRCUIT | ON |
| STANDBY POWER SUPPLY CIRCUIT | ON |

FIG.48A

VIRTUAL VOLUME CONFIGURATION
MANAGEMENT TABLE OF STORAGE CONTROLLER SC2

35300

| VIRTUAL VOLUME ID | CAPACITY | ALLOCATION DESTINATION | CONTROLLER ID | EXTERNAL CONNECTION PORT ID | REAL STORAGE INFORMATION | |
|---|---|---|---|---|---|---|
| | | | | | APPARATUS ID | INTERNAL APPARATUS VOLUME ID |
| V1-VOL1 | 100GB | H2 | Ctrl0 | Port1 | ST4 | VOL003 |
| V1-VOL2 | 50GB | H3 | Ctrl0 | Port0 | ST3 | VOL002 |
| V1-VOL3 | 100GB | H4 | Ctrl0 | Port1 | ST4 | VOL001 |

FIG.48B

POWER SUPPLY MANAGEMENT TABLE OF STORAGE CONTROLLER SC1

35500

| COMPONENT ID | POWER SUPPLY STATUS |
|---|---|
| Port 0 | ON |
| Port 1 | ON |
| CONTROLLER 0 | ON |
| NETWORK I/F 0 | ON |
| NETWORK I/F 1 | ON |
| MAIN POWER SUPPLY CIRCUIT | ON |
| STANDBY POWER SUPPLY CIRCUIT | ON |

STORAGE SYSTEM INCLUDING PLURALITY OF STORAGE APPARATUSES

CROSS-REFERENCES TO RELATED APPLICATIONS

This application relates to and claims the benefit of priority from Japanese Patent Application No. 2006-187993, filed on Jul. 7, 2006, the entire disclosure of which is incorporated herein by reference.

BACKGROUND

1. Field of the Invention

The present invention generally relates to storage technology and, more specifically, to power saving technology in storage systems, which include a plurality of storage apparatuses.

2. Description of Related Art

Various types of data are being handled by enterprises and individuals, and the amount data stored in storage devices is increasing rapidly due to the requirements to store electronic data for longer periods of time. Thus, in order to realize flexible scalability and reduction in management costs through uniform storage management, a storage area network configuration (primarily referred to as a SAN (Storage Area Network)) that connects a plurality of servers and a plurality of storage apparatuses with switches or hubs is used as the storage system. The progress of the storage system technology continuously demands more sophisticated functions and lower storage costs. With the emphasis on environmental issues in recent years, there are also requirements relating to energy efficiency of the data storage equipment.

In order to improve energy efficiency of the data storage systems, (energy saving) technology is disclosed for frequently monitoring the volume access from a host system using a storage extent (hereinafter also referred to as a "volume") of a storage apparatus in a stand-alone storage apparatus, and migrating the disk apparatuses configuring the volume to an energy saving mode or turning off the power supply when there is no access from the host system for a prescribed period of time. In addition, technology is disclosed for diagnosing the disk apparatuses after the lapse of a prescribed period of time from the start of the energy saving process or when reaching a designated time in order to maintain the reliability regarding the disk apparatuses subject to the energy saving process. For instance, the power supply control technology of the disk apparatus in the storage apparatus disclosed in Japanese Patent Laid-Open Publication No. 2000-293314 (Patent Document 1) uses the power supply control of the disk apparatus provided to the storage apparatus according to the volume access frequency of the host system using the volume.

SUMMARY

Nevertheless, the method disclosed in the Patent Document 1 does involve the control of the main power supply circuit (case power supply circuit) of the storage apparatus itself other than the disk apparatuses. Therefore, with a storage system including a plurality of storage apparatuses which may consume excess power when there is no access from the host system to the storage apparatus, because the power supply circuits other than the disk apparatuses are turned on even when the disk apparatuses are turned off or in an energy saving mode, consumption of such excess power could increase in proportion to the number of storage apparatuses configuring the storage system.

Thus, in accordance with an aspect of the present invention, there is provided a storage system that is capable of avoiding the consumption of excess power in a storage system configured from a plurality of storage apparatuses. Further, an aspect of the present invention provides a storage system capable of inhibiting power consumption regardless of the access frequency from the host system to the storage device of the storage apparatus. Moreover, the storage system of an aspect of the present invention migrates a certain volume from a first storage apparatus having such volume accessed from the host system to a second storage apparatus, and turns off the power supply of the first storage apparatus that does not have a volume accessed from the host system.

In addition, the storage system in accordance with an aspect of the present invention turns off the power supply of a storage apparatus only having a volume that is not accessed from the host system based on a schedule or plan concerning the access from the host system to the respective volumes of one or more storage apparatuses configuring the storage system. Further, the storage system in accordance with an aspect of the present invention migrates the volume from the first storage apparatus to the second storage apparatus based on the foregoing schedule or plan. Moreover, in an embodiment of the present invention, the foregoing schedule and plan correspond to the business schedule to be performed by the host system, and the power supply of the storage apparatus is controlled based on the information concerning this business schedule.

Incidentally, migration of a volume from a certain storage apparatus to another storage apparatus, or the exchange of a volume of a certain storage apparatus and a volume of another storage apparatus is conducted by copying the data stored in the migration source volume from the migration source volume of the first storage system to the migration destination volume of the second storage apparatus.

Specifically, according to an embodiment of the present invention, there is provided a storage system comprising one or more host systems, a plurality of storage apparatuses in which each storage apparatus has a plurality of storage devices and uses the storage device to provide the host system with a storage extent accessible by the host system, and a management apparatus for managing the storage apparatuses, wherein said management apparatus includes information concerning the access schedule where said host system accessed said storage extent, and, based on the schedule information, the management apparatus turns off the main power supply of the storage apparatuses that do not have a storage extent to be accessed by the host computer during the period the host system does not access the storage extent.

According to another embodiment of the present embodiment, there is provided a storage system comprising one or more host systems, a plurality of storage apparatuses in which each storage apparatus has a plurality of storage devices and uses the storage device to provide the host system with a storage extent accessible by the host system, and a management apparatus for managing the storage apparatuses, wherein said management apparatus includes information concerning the access schedule where said host system accessed said storage extent, and, based on the schedule information, to a second storage apparatus, the management apparatus migrates to a second storage apparatus a storage extent of a first storage apparatus having the storage extent to be accessed by the host system, creates a period in which the first storage apparatus does not have the storage extent to be accessed by the host system, and turns off the main power supply the first storage apparatus during the period.

With a storage system configured from a plurality of storage apparatuses, the present invention achieves the effect of being able to provide a storage system capable of avoiding the consumption of excess power when the host system provides business to a user.

DESCRIPTION OF DRAWINGS

The accompanying drawings, which are incorporated in and constitute a part of this specification exemplify the embodiments of the present invention and, together with the description, serve to explain and illustrate principles of the inventive technique. Specifically:

FIG. 7 is a diagram showing an exemplary configuration of a table provided to the storage apparatus 20000 according to an embodiment of the present invention;

FIG. 8 is a diagram showing an exemplary configuration of a table provided to the management computer 40000 according to an embodiment of the present invention;

FIG. 11 is a diagram showing an exemplary configuration of a table provided to the management computer 40000 according to an embodiment of the present invention;

FIG. 12 is a diagram showing an exemplary configuration of a table provided to the management computer 40000;

FIG. 15 is a diagram showing an exemplary I/O screen provided by the program;

FIG. 16 is a diagram showing an exemplary I/O screen provided by the program;

FIG. 22 is a diagram showing a table representing the execution process of the power supply control command program 42150 according to an embodiment of the present invention;

FIG. 23 is a diagram showing a table representing the execution process of the power supply control command program 42150 according to an embodiment of the present invention;

FIG. 24A and FIG. 24B are diagrams showing a table representing the execution process of the power supply control command program 42150 according to an embodiment of the present invention;

FIG. 25A and FIG. 25B are diagrams showing a table representing the execution process of the power supply control command program 42150 according to an embodiment of the present invention;

FIG. 28 is a diagram showing a table representing the execution process of the power supply control command program 42150 according to an embodiment of the present invention;

FIG. 32A and FIG. 32B are diagrams showing a detailed exemplary configuration of a table provided to the storage controller 30000 according to another embodiment of the present invention;

FIG. 33 is a diagram showing a detailed exemplary configuration of a table provided to the storage controller 30000 according to another embodiment of the present invention;

FIG. 34 is a diagram showing a detailed exemplary configuration of a table provided to the management computer 40001 according to another embodiment of the present invention;

FIG. 35 is a diagram showing a detailed exemplary configuration of a table provided to the management computer 40001 according to another embodiment of the present invention;

FIG. 36 is a diagram showing a detailed exemplary configuration of a table provided to the management computer 40001 according to another embodiment of the present invention;

FIG. 37 is a diagram showing a detailed exemplary configuration of a table provided to the management computer 40001 according to another embodiment of the present invention;

FIG. 45A and FIG. 45B are detailed flowchart of the power supply control command program 42150 according to another embodiment of the present invention;

FIG. 46A and FIG. 46B are detailed flowchart of the power supply control command program 42150 according to another embodiment of the present invention;

FIG. 47A and FIG. 47B are detailed flowchart of the power supply control command program 42150 according to another embodiment of the present invention; and FIG. 48A and FIG. 48B are detailed flowchart of the power supply control command program 42150 according to another embodiment of the present invention.

DETAILED DESCRIPTION

An embodiment of the present invention will now be described in detail with reference to the attached drawings. Incidentally, the present invention is not in any way limited by the following explanation, and this invention may be modified or improved without deviating from the gist hereof, and such equivalents are also covered herein. The term "main power supply" as used herein refers to a power supply that supplies running power to one or more components such as storage devices and controllers configuring a storage apparatus, and the term "standby power supply" refers to a power supply for supplying necessary, and more preferably the minimum power for maintaining the boot status of the storage apparatus.

(1) Configuration of Storage System in First Embodiment

Configuration of the storage system according to a first embodiment will now be described. FIG. 1 to FIG. 6 show the configuration of the storage system and the configuration of the apparatuses connected to the storage system, and FIG. 7 to FIG. 14 show management information loaded in the respective apparatuses.

Figure 1:
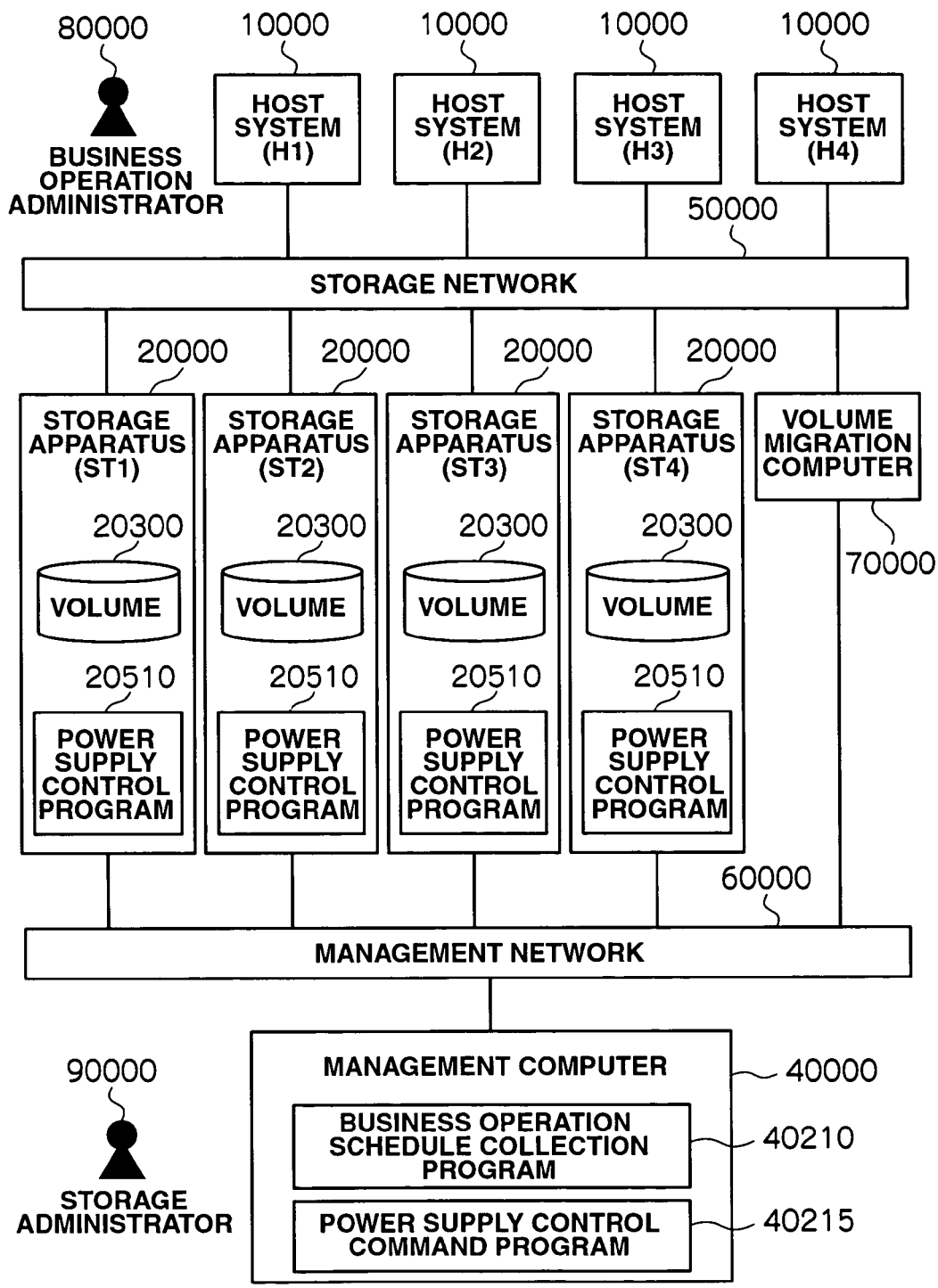
FIG. 1 is a diagram showing an exemplary configuration of the storage system according to an embodiment of the present invention.

FIG. 1 shows the configuration of the storage system. The storage system is configured by one or more host systems 10000 and one or more storage apparatuses 20000 using one or more volumes 20300 being mutually connected via a storage area network 50000.

Further, a management computer 40000 for managing the storage apparatuses 20000 is connected to a plurality of storage apparatuses 20000 via a management network 60000. The storage area network 50000 is equipped with a volume migration computer 70000 for controlling the migration of volumes among the plurality of storage apparatuses 20000.

The volume migration computer 70000 is also connected to the management network 60000 so that it can receive a data migration request from the management computer 40000. Although the volume migration computer is indicated as an apparatus that is separate from the storage apparatus and management computer in FIG. 1, a controller in the storage apparatus or the management computer can also double as a volume migration control means.

Host systems H1, H2, H3 and H4 are able to respectively access storage apparatuses ST1, ST2, ST3 and ST4 via the storage area network 50000. Incidentally, the storage area network 50000 is a network using a fibre channel protocol, and the management network 60000 is a network using an IP protocol.

Figure 14:
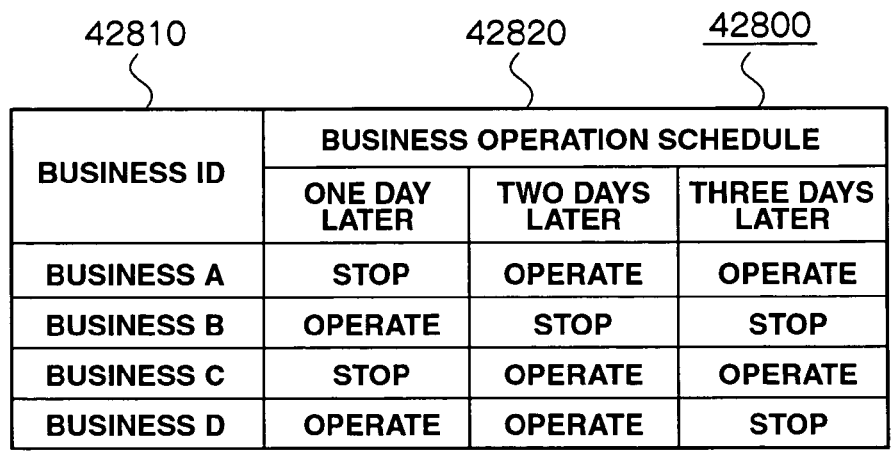
FIG. 14 is a diagram showing an exemplary configuration of a table provided to the management computer 40000.

A storage administrator 90000 is able to use the management computer 40000 and respectively manage one or more storage apparatuses 20000 (ST1 to ST4). A business operation administrator 80000 administers the business provided by one or more host systems 10000 (H1 to H4) to a user. For instance, the [business operation administrator 80000] may provide to a user a plurality of businesses concerning the management of bank deposits and postal savings using a plurality of host systems. Provision of business to a user is realized in the form of a business operation schedule. FIG. 14 described below is a management table concerning such business operation schedule. The business operation schedule is a schedule of the host accessing a volume of the storage apparatus. In other words, one business is provided to a user by the execution of a business application program of one host system. During the implementation of such business, the host system stores data in a specified volume that is accessible by the host system, or reads data from a specified volume.

Figure 2:
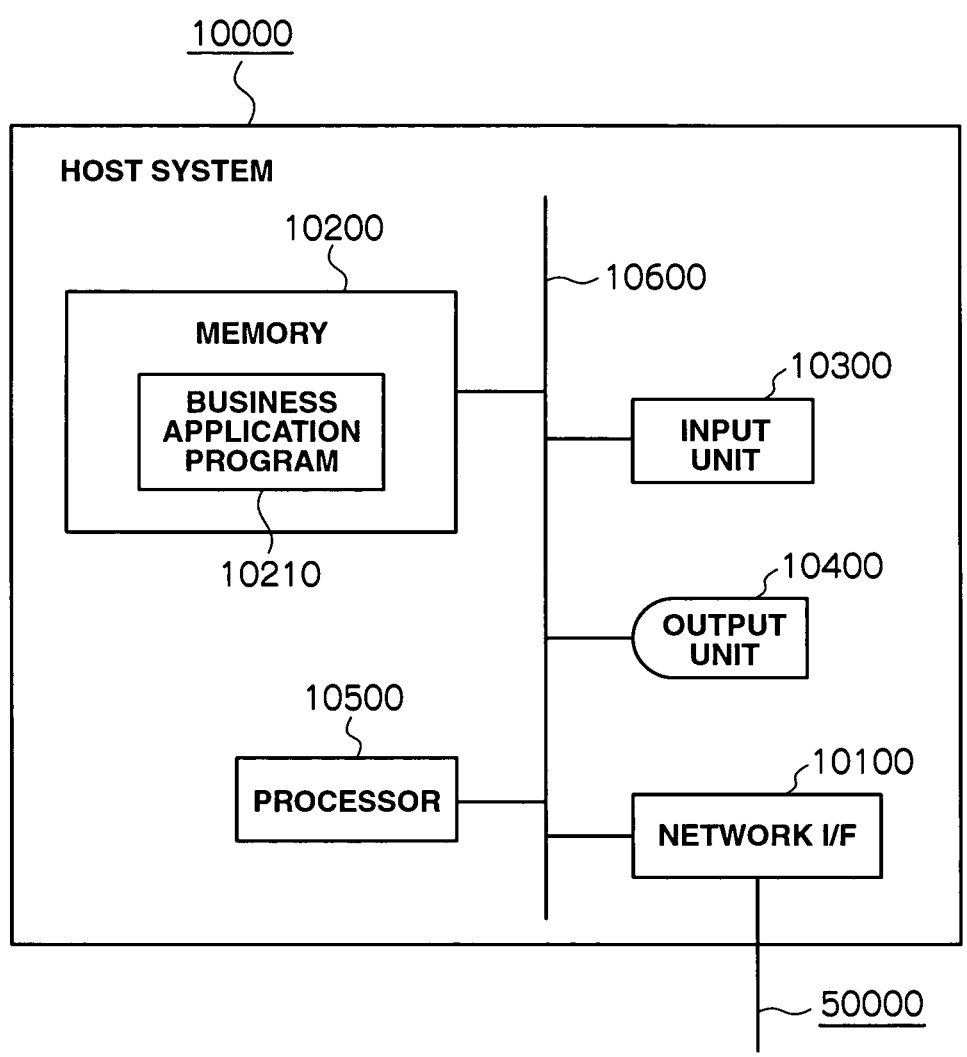
FIG. 2 is a diagram showing a detailed exemplary configuration of the host system 10000.

FIG. 2 shows a detailed configuration example of the host system 10000. The host system 10000 has a processor 10500, a memory 10200, one or more network interfaces (I/F) 10100 to be connected to the storage area network 50000, an output unit 10400 such as a display apparatus for outputting the processing results, and an input unit 10300 such as a keyboard or a mouse, and these are mutually connected via an internal bus 10600. An OS (Operating System) and one or more business application programs 10210 for performing processing involving data access to the volume 20300 are loaded into the memory 10200 from a storage medium such as a hard disk (not shown), and data of the volume 20300 of the storage system is read and written by the processor 10500 executing these programs.

Figure 3:
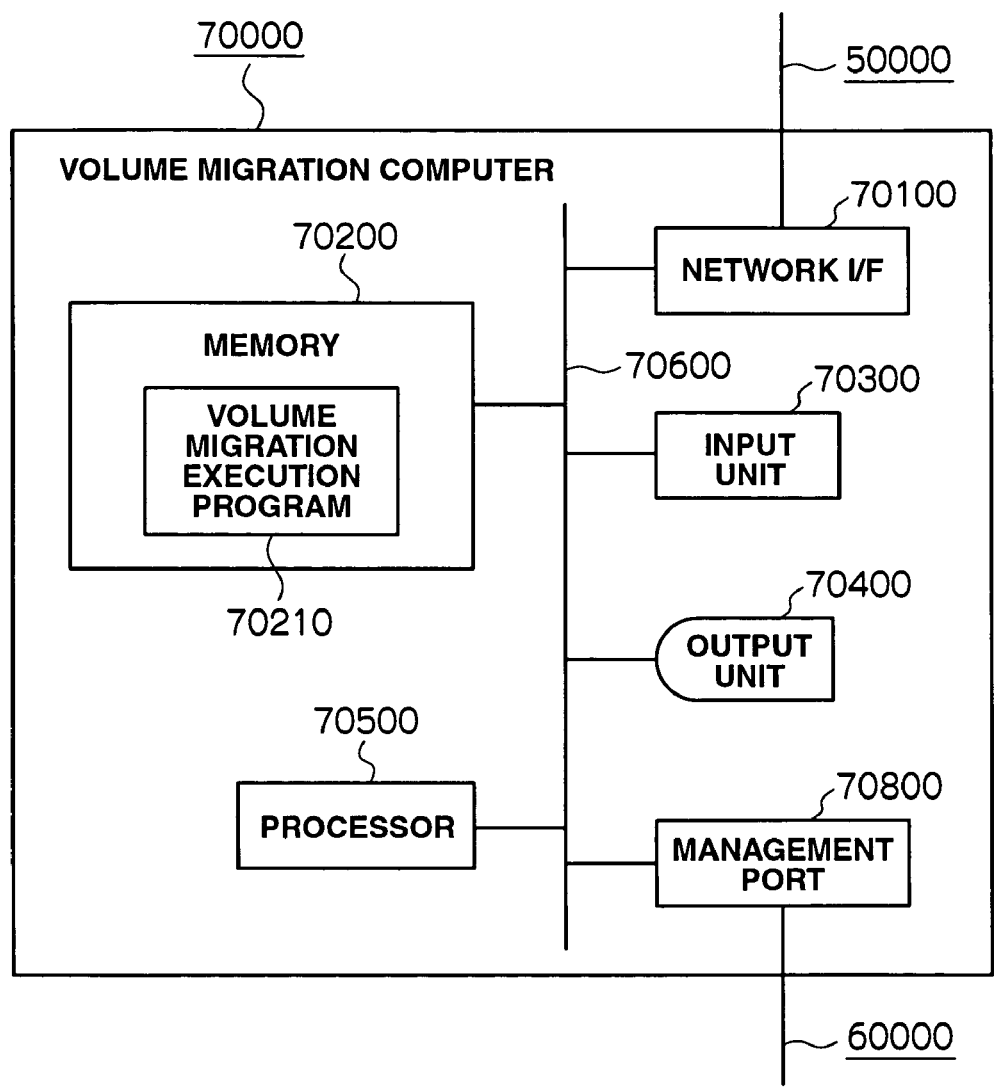
FIG. 3 is a diagram showing a detailed exemplary configuration of the storage apparatus 20000.

FIG. 3 shows a detailed configuration example of the volume migration computer 70000. The volume migration computer 70000 has a processor 70500, a memory 70200, one or more network interfaces 70100 to be connected to the storage area network 50000, one or more management ports 70800 to be connected to the management network 60000, an output unit 10400 such as a display apparatus for outputting the processing results, and an input unit 10300 such as a keyboard or a mouse, and these are mutually connected via an internal bus 70600. An OS (Operating System) and a volume migration execution program 70210 for executing migration of data of the volume 20300 among the storage apparatuses 20000 are loaded into the memory from a storage medium such as a hard disk (not shown), and data of the volume 20300 is read and written by the processor 70500 executing these programs.

Figure 4:
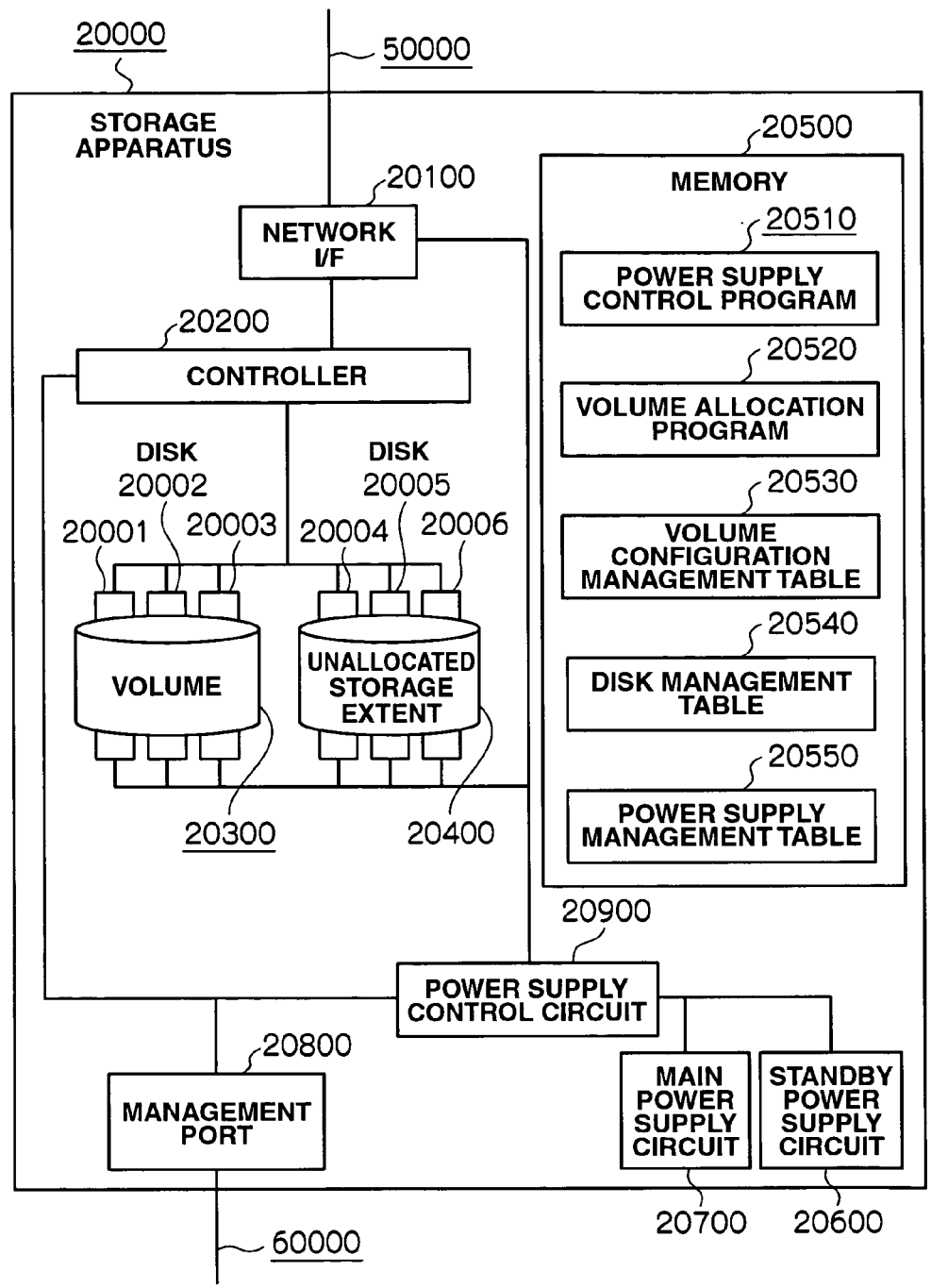
FIG. 4 is a diagram showing a detailed exemplary configuration of the management computer 40000 according to an embodiment of the present invention.

FIG. 4 shows a detailed configuration example of the storage apparatus 20000. The storage apparatus 20000 has a network interface 20100 for connecting to the storage area network 50000, a management port 20800 for connecting to the management network 60000, disks 20001, 20002, 20003, 20005, 20005 and 20006 as a storage medium such as a hard disk, a volume 20300 allocated to the host system 10000, an unallocated storage extent 20400, and a power supply control circuit 20900 for controlling the power supply to the components in the storage apparatus 20000, and these are connected to and controlled by a controller 20200 in the storage apparatus 20000.

The storage apparatus 20000 also has a circuit (hereinafter referred to as the "main power supply circuit") 20700 for supplying the main power supply to the respective constituent elements (hereinafter referred to as the "components") such as storage devices (disks or the like) and controllers configuring and located inside the storage apparatus 20000, and a standby power supply circuit 20600 for supplying to the controller 20200 and memory 20500 the power required to execute the respective programs in the memory 20500 when the main power supply circuit 20700 is turned off, and these are connected to the power supply control circuit 20900. The power supply control circuit supplies main power to all components requiring the supply of power, selects a specified component and supplies main power supply to the selected component, or supplies standby power to the controller and the memory. The controller 20100 controls the power supply from the power supply circuit. The volume 20300 is realized by configuring the physical storage extent of one or more disks in RAID.

The memory 20500 stores a power supply control program 20510 for executing the power supply control request in the storage apparatus 20000 issued from the management computer 40000, a volume 20300 allocation program 20520 for executing the creation and deletion request of the volume 20300 in the storage apparatus 20000 and allocation request to the host system 10000 issued from the management computer 40000, a volume management table 20530 for retaining the configuration of the volume 20300 and allocation to the host system 10000, a disk management table 20540 for managing the disks of the storage apparatus 20000, and a power supply management table 20550 for retaining the power supply status of the components in the apparatus. The respective programs and respective tables are loaded from a storage medium such as a hard disk (not shown) upon activation of the storage apparatus 20000, and processed by the controller 20200.

Figure 5:
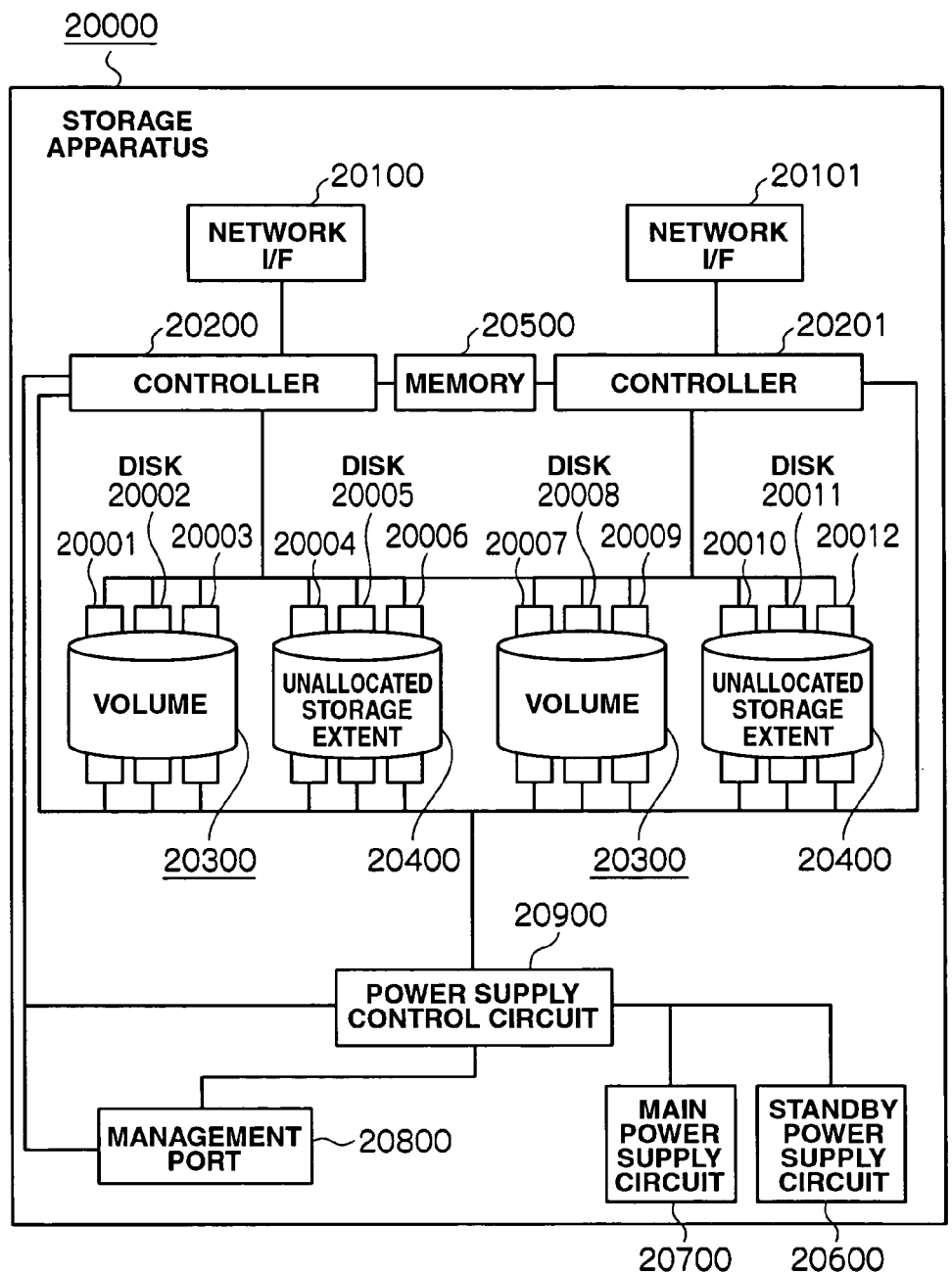
FIG. 5 is a diagram showing an exemplary configuration of a table provided to the storage apparatus 20000 according to an embodiment of the present invention.

FIG. 5 also shows a detailed configuration example of the storage apparatus 20000. FIG. 5 shows an example of redundantly configuring the controller 20200, the network I/F 20101, the volume 20300 and the unallocated storage extent 20400 in the storage apparatus 20000.

The storage apparatus 20000 has a network interface 20100 for connecting to the storage area network 50000, a management port 20800 for connecting to the management network 60000, disks 20001, 20002, 20003, 20004, 20005, 20006, 20007, 20008, 20009, 20010, 20011 and 20012 as a storage medium such as a hard disk, one or more volumes 20300 allocated to the host system 10000, an unallocated storage extent 20400, and a power supply control circuit 20900 for controlling the power supply to the components in the storage apparatus 20000, and these are connected to and controlled by a controller 20200 in the storage apparatus 20000.

Figure 6:
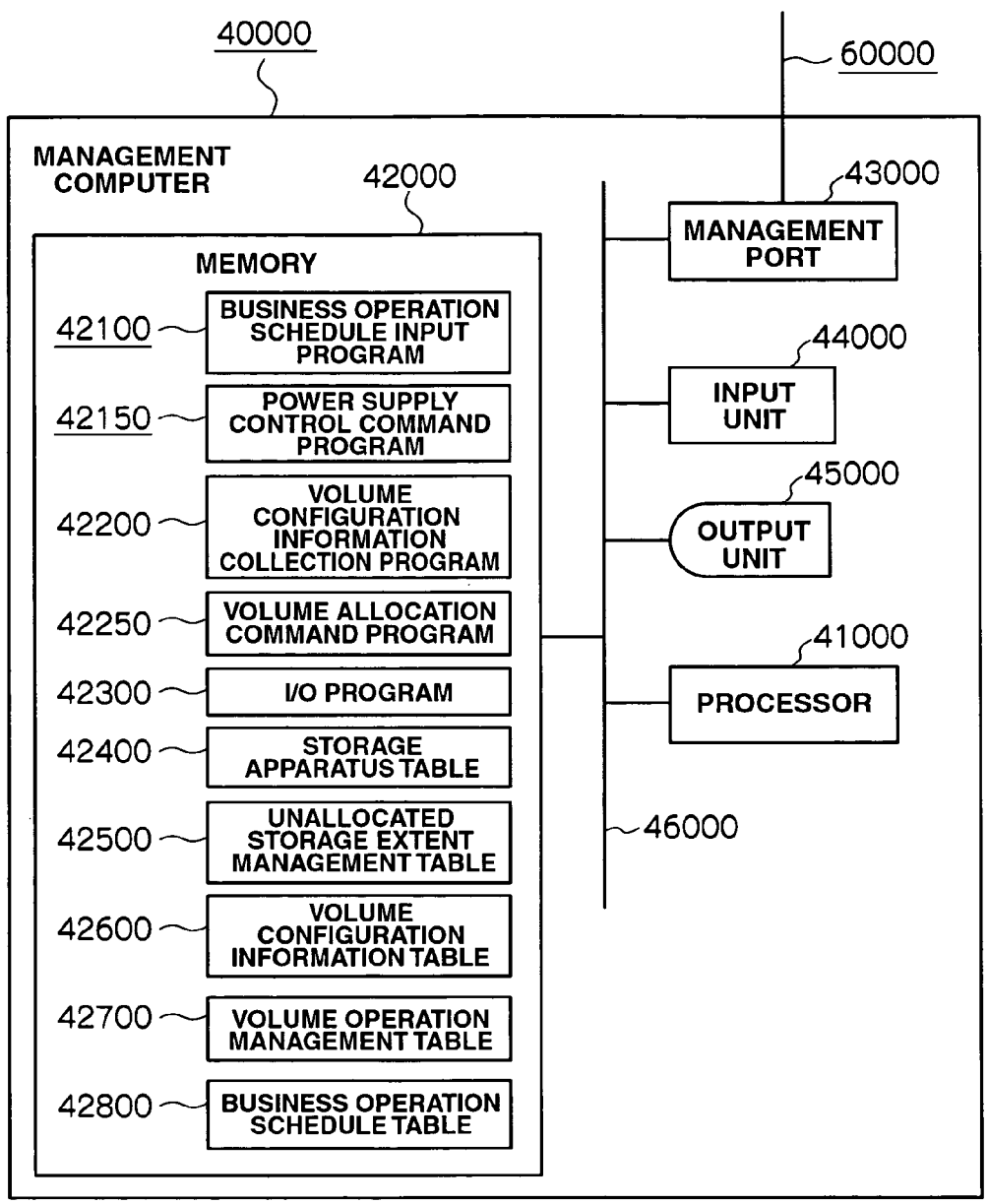
FIG. 6 is a diagram showing an exemplary configuration of a table provided to the storage apparatus 20000 according to an embodiment of the present invention.

FIG. 6 shows a detailed configuration example of the management computer 40000. The management computer 40000 has a processor 41000, a memory 42000, a management port 43000 for connecting to the management network 60000, an output unit 45000 such as a display apparatus for outputting the processing results, and an input unit 44000 such as a keyboard or a mouse, and these are mutually connected via an internal bus 46000.

The memory 42000 stores a business operation schedule input program 42100 described below, a power supply control command program 42150, a volume configuration information collection program 42200, a volume allocation command program 42250, an I/O program 42300, a storage apparatus table 42400 for specifying the storage apparatus to be managed, an unallocated storage extent management table 42500 for retaining the unallocated storage extent 20400 of the storage apparatus 20000 to be managed, a volume configuration information table 42600 for retaining the configuration information of the allocated volume 20300 of the storage apparatus to be managed, a volume operation management table 42700 for retaining the volume to be used in the business carried out by a user using the host system 10000, and a business operation schedule table 42800 for retaining the business operation schedule.

The respective programs and respective tables are realized by the processor 41000 executing these upon loading them from a storage medium such as a hard disk (not shown) to the memory 42000. Further, although not shown, an OS (Operating System) is loaded from the storage medium to the memory 42000, and the processor 41000 executes the respective programs.

Figure 9:
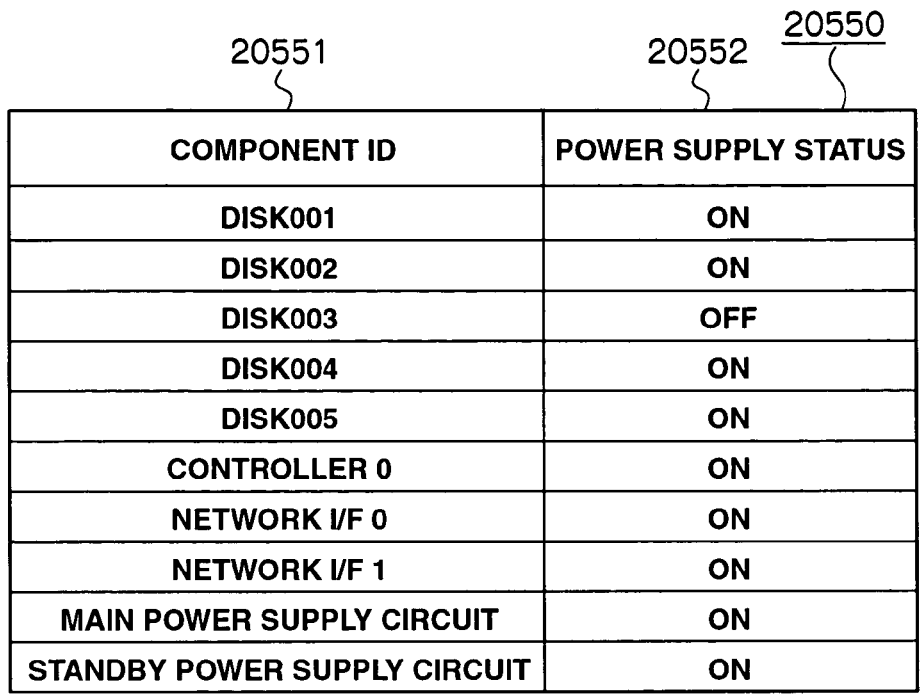
FIG. 9 is a diagram showing an exemplary configuration of a table provided to the management computer 40000 according to an embodiment of the present invention.

FIG. 7, FIG. 8 and FIG. 9 show examples of tables of the storage apparatus 20000. FIG. 7 is an example of the volume configuration management table 20530 showing a configuration of the storage extent of the storage apparatus 20000. The volume configuration management table 20530 is configured from a field 20531 for registering a volume ID as an identifier for uniquely identifying the volume 20300 and unallocated storage extent 20400 in the storage apparatus 20000, a field 20532 for registering the capacity of the volume 20300 and unallocated storage extent 20400, a field 20533 for registering the allocation destination host system of the volume 20300, a field 20534 for registering the network interface 20100 to be used by the volume 20300 for connecting to the storage area network 50000, and a field 20535 for registering the identifier of an array group configuring the volume 20300.

FIG. 8 is an example of the disk management table 20540 showing an array group configured from a disk 20001, a disk capacity, and a plurality of disks of the storage apparatus 20000. The disk management table 20540 is configured from a field 20541 for registering a disk ID as an identifier for uniquely identifying the disk 20001 in the storage apparatus 20000, a field 20542 for registering the capacity of the disk, and a field 20543 for registering an identifier of an array group configured from the disk 20001. Here, the same identifier of the volume configuration management table 20530 is used as the identifier of the array group.

FIG. 9 is an example of the power supply management table 20550 for monitoring the power supply status of the components in the storage apparatus 20000. The power supply management table 20550 is configured from a field 20551 for registering a component ID as an identifier for uniquely identifying the respective components, which are apparatuses configuring the storage apparatus 20000, in the storage apparatus 20000, and a field 20552 for registering the power supply status.

Figure 10:
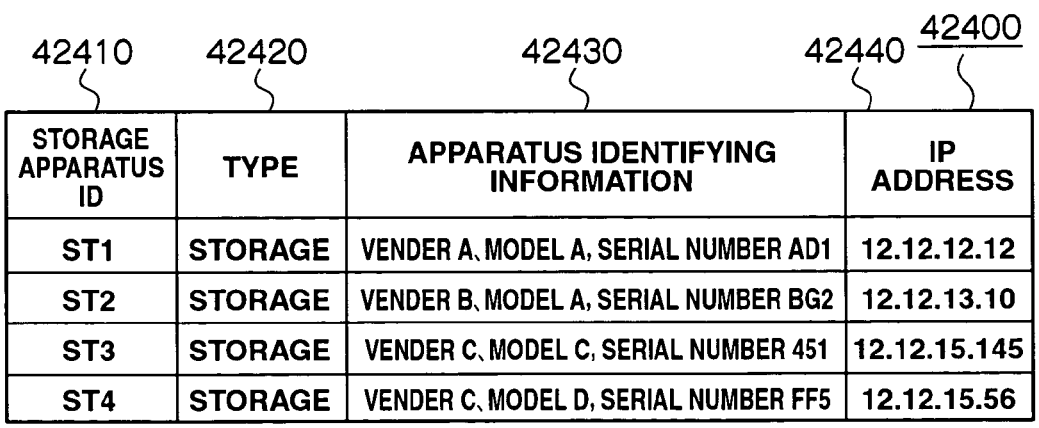
FIG. 10 is a diagram showing an exemplary configuration of a table provided to the management computer 40000 according to an embodiment of the present invention.

FIG. 10, FIG. 11, FIG. 12, FIG. 13 and FIG. 14 show examples of the respective tables of the management computer 40000. FIG. 10 is an example of the storage apparatus table 42400 for the management computer 40000 to specify the storage apparatus 20000 to be managed. The storage apparatus table 42400 is configured from a field 42410 for registering a storage apparatus ID as an identifier for uniquely identifying the apparatus to be managed in the management computer 40000, a field 42420 for registering the type of apparatus, a field 42430 for registering apparatus identifying information such as the vendor name, model name or serial number of the apparatus to be managed for uniquely specifying the apparatus, and a field 42440 for registering an IP address of the management port 20800 for connecting to the management port 20800 of the apparatus to be managed.

Incidentally, the foregoing information may also be pre-registered from the management computer 40000 by the storage administrator 90000 handling the management computer 40000. Such information may also be automatically created using a name service or the like on the storage area network 50000 or the management network 60000.

FIG. 11 is an example of the unallocated storage extent management table 42500 for managing the capacity of the unallocated storage extent 20400 provided to the storage apparatus 40000 and which has not been allocated to the host system. The unallocated storage extent management table 42500 is configured from a field 42510 for registering the storage apparatus ID, and a field 42520 for registering the capacity of the unallocated storage extent 20400.

FIG. 12 is an example of the volume configuration information table 42600 for the management computer 40000 to manage the volume 20300 allocated to the host system and which is in the storage apparatus 20000 to be managed. The volume configuration information table 42600 is configured from a field 42610 for registering an apparatus ID of the storage apparatus 20000, a field 42620 for registering a volume ID in the apparatus for uniquely identifying the volume 20300 in the storage apparatus 20000, a field 42630 for registering the capacity of the volume, a field 42640 for registering the allocation destination host system of the volume 20300, a field 42650 for registering a controller ID of the controller 20200 that controls the volume 20300, and a [field] 42660 for registering an array group configuring the volume 20300.

Figure 13:
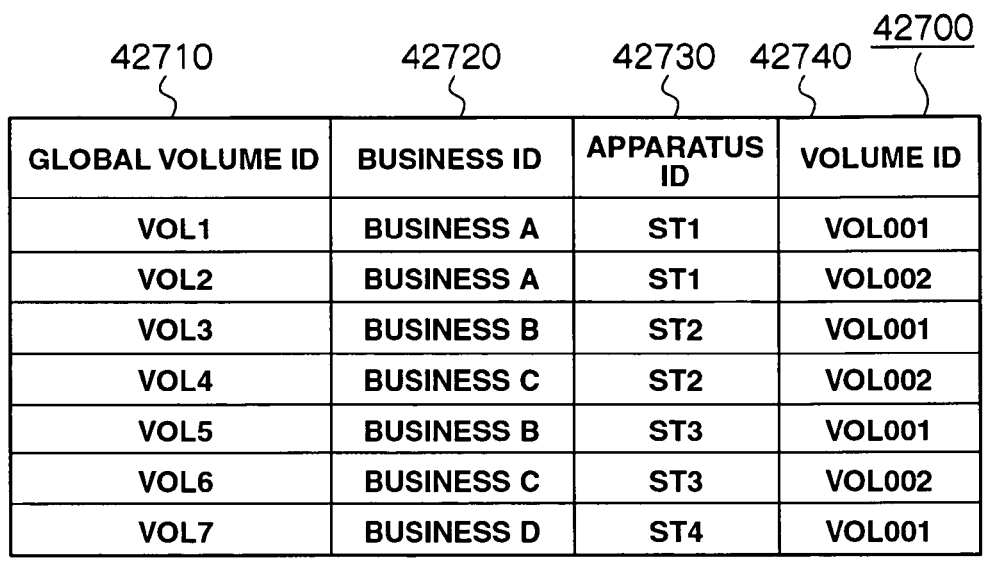
FIG. 13 is a diagram showing an exemplary configuration of a table provided to the management computer 40000.

FIG. 13 is an example of the volume operation management table 42700 for retaining information that associates a business ID, and a volume ID (global volume ID) to be accessed by the host system upon executing the business specified by the business ID. The volume operation management table 42700 is configured from a field 42710 for registering a global volume ID for the management computer 40000, the business operation administrator 80000 and the storage administrator 90000 to uniquely identify the volume 20300, a field 42720 for registering a business ID for the management computer 40000, the business operation administrator 80000 and the storage administrator 90000 to uniquely identify the business to use the volume 20300, a field 42730 for registering an ID of the storage apparatus 20000 storing the volume 20300, and a field 42740 for registering a volume ID in the apparatus.

FIG. 14 is an example of the business operation schedule table 42800 for the business operation administrator 80000 to retain the timing or cycle of starting and stopping the operation of business that it is handling. The business operation schedule table 42800 is configured from a field 42810 for registering a business ID, and a field 42820 for registering the business operation schedule of operating or stopping the business. Here, in FIG. 14, although an example is shown where the business operation schedule is registered in day units, a business operation schedule may be registered so that it is unified in an arbitrary and fixed period such as weeks, months or years in the business operation schedule table 42800. Moreover, even after the business operation schedule is registered in the business operation schedule table 42800, contents of the business operation schedule table 42800 may be changed according to changes in the business conducted by the business operation administrator 80000. As shown in FIG. 13, business is in correspondence with the volume, and, because a volume can be migrated among a plurality of storage apparatuses, the volume for executing a plurality of businesses with the overall storage system can be consolidated into certain storage apparatuses and the power supply of the remaining storage apparatuses can be turned off by migrating the volume corresponding to the business to be operated that day to another storage apparatus.

(2) Detailed Description of Programs in First Embodiment (2-1) Respective Programs Loaded in Storage Apparatus The processing flow of the power supply control program 20510 and the volume allocation program 20520, which are programs to be executed by the storage apparatus 20000 in the first embodiment, will now be described.

The controller 20200 receives a command (hereinafter referred to as the "power supply control request") for controlling the power supply of the storage apparatus sent from the management computer 40000 via the management network 60000, executes the power supply control program 20510 based on this control command, and thereby operates the power supply control circuit. Specifically, when the storage apparatus 20000 receives the power supply control request, the controller 20200 sends a control signal to the power supply control circuit 20900 for making the power supply to the component designated by the power supply control request into a status designated in the request. The power supply control circuit realizes in the storage apparatus the power supply control processing such as turning off the main power supply circuit and turning on the standby power supply circuit, or turning off the power supply switch of the respective components while leaving on the main power supply circuit. The controller registers the status after the foregoing control has been applied in the power supply management table.

Further, when an access request for the host system 10000 or volume migration execution means (volume migration computer) 70000 to access the volume 20300 or unallocated storage extent 20400 is sent to the storage apparatus in which the main power supply circuit 20700 is turned off, the power supply control program 20510 turns on the main power supply circuit 20700 and supplies power to the disk 20001 and controller 20200 configuring the volume 20300 to be accessed.

The volume allocation program 20520 is a program for performing the creation of the volume 20300 in the storage apparatus 20000 and allocation of the volume 20300 to the designated host system 10000, and the allocation release of the volume 20300 and registration of the released volume 20300 in the unallocated storage extent 20400, and is executed by the controller 20200 in the storage apparatus 20000. Specifically, when the controller 20200 receives an allocation request for allocating the volume 20300 from the management computer 40000 to the host system 10000, it sets the volume allocation program 20520 to the volume allocation mode for allocating the volume, and executes this program.

The controller 20200 creates the volume 20300 of a capacity designated in the volume allocation request from the unallocated storage extent 20400, and allocates the volume 20300 to the designated host system 10000. Subsequently, the controller 20200 updates the volume configuration management table 20530, the disk management table 20540, and the power supply management table 20550. Finally, the controller 20220 sends the internal apparatus volume 20300 ID of the created volume 20300 to the management computer 40000, and ends the volume allocation program 20520. Further, when the storage apparatus 20000 receives a volume 20300 release request from the management computer 40000, the controller 20200 executes the volume allocation program 20520 in a volume 20300 release mode. Subsequently, the controller 20200 releases the allocation of the designated volume 20300 to the designated host system 10000, and registers the volume 20300 in the unallocated storage extent 20400.

The controller 20200 thereafter updates the volume configuration management table 20530, the disk management table 20540, and the power supply management table 20550. Finally, when the controller 20200 sends a notice indicating the success of the volume 20300 allocation release to the management computer 40000, it ends the volume allocation program 20520.

(2-2) Volume Migration Execution Program Loaded in Volume Migration Computer

The volume migration execution program 70210 according to the present embodiment, for instance, is a program that is executed by an independent volume migration computer 70000 that receives information including an internal apparatus volume ID of the storage apparatus 20000 to become the command parameter via the management computer 40000 and the management network 60000. Migration of the volume 20300 between the storage apparatuses 20000 via the storage area network 50000 is conducted by executing the volume migration execution program 70210.

Specifically, information to become the parameter; that is, the storage apparatus 20000 of the migration source and the internal apparatus volume ID, and the storage apparatus 20000 of the migration destination and the internal apparatus volume ID are sent from the management computer 40000 to the volume migration computer 70000. Here, the volume 20300 is a block aggregate in 512 byte units storing data.

The volume migration execution program 70210 copies the first block to the last block of the volume 20300 of the storage apparatus 20000 of the migration source to the volume 20300 of the storage apparatus 20000 of the migration destination based on the parameter received from the management computer 40000. Further, when a swap (exchange) command of the volume 20300 is delivered from the management computer 40000 to the volume migration computer 70000, the volume migration execution program 70210 sequentially exchanges the blocks of the volume 20300 of the storage apparatus 20000 of the migration source and the blocks of the volume 20300 of the storage apparatus 20000 of the migration destination from the first block. Therefore, the management computer 40000 only has to deliver the storage apparatus 20000 of the migration source and the internal apparatus volume 20300 ID, and the storage apparatus 20000 of the migration destination and the internal apparatus volume 20300 ID as the command parameter to the volume migration computer 70000.

(2-3) Respective Programs Loaded in Management Computer (2-3-1) Volume Configuration Information Collection Program and I/O Program Flow of the respective program to be executed by the management computer 40000 in the first embodiment will now be described with reference to FIG. 15 to FIG. 28. Foremost, the volume configuration information collection program 42200 and I/O program 42300 (detailed flow not shown) are described.

The volume configuration information collection program 42200 is a program periodically executed by the management computer 40000, or to be executed by the management computer 40000 based on a command from the storage administrator 90000 or a command from another program loaded in the management computer 40000 for collecting information configuring the storage apparatus 20000 to be managed. Specifically, a configuration information acquisition command is issued to a plurality of storage apparatuses 20000 registered in the storage apparatus table 42400 using an IP address in the IP address field 42440 of the storage apparatus 20000, and a value in the volume configuration management table 20530 of the storage apparatus 20000 is acquired.

The management computer 40000 copies the acquired value of the volume configuration management table 20530 to the respective fields corresponding to the volume operation management table 42700 in the management computer 40000. Meanwhile, the volume configuration information collection program 42200 copies the acquired value of the unallocated storage extent 20400 shown in the volume configuration management table 20530 to the respective fields corresponding to the unallocated storage extent management table 42500. By using the volume configuration information collection program 42200, the management computer 40000 is able to keep the value of the volume configuration information of the storage apparatus 20000 to be managed up to date.

The I/O program 42300 is a program for outputting an input request for inputting the business operation schedule input program 42100 and the volume allocation command program 42250 described below to the output unit of the management computer 40000 so that the business operation administrator 80000 or the storage administrator 90000 receives the execution command to the business operation schedule input program 42100 and the volume allocation command program 42250, and thereby starts the business operation schedule input program 42100 and the volume allocation command program 42250. Although the present embodiment illustrates an example of displaying the input request on a screen as shown in FIG. 15 or FIG. 16 described below, the input request is not limited thereto, and may also be batch processing through entry of configuration files or processing via a command input.

(2-3-2) Business Operation Schedule Input Program

Other programs loaded in the management computer 40000 are now described. The business operation schedule retaining information on the timing or cycle of starting and stopping the operation of business that the business operation administrator 80000 is handling is registered in the business operation schedule table 42800 by the management computer 40000 executing the business operation schedule input program 42100.

The I/O program 42300 outputs a business operation schedule input screen H1000 as shown in FIG. 15, and acquires the business operation schedule of operating or stopping the business from the business operation administrator 80000 or the storage administrator 90000. The business operation schedule input screen H1000 is configured from a field H1005 for inputting a business ID for uniquely identifying the business with the storage system, a field H1010 for inputting the date, a field H1015 for selecting the operation or stoppage of business of the designated date, a registration button H1020 for registering the input information, and a cancel button H1025 for canceling the input. Here, input to the business operation schedule input screen H1000 is conducted by the business operation administrator 80000 or the storage administrator 90000 via the input unit of the management computer 40000.

When the business operation administrator 80000 or the storage administrator 90000 pushes the registration button H1020, the business operation schedule input program 42100 is commenced. Based on the business operation schedule program 42100, the provided input information is registered in the respective corresponding fields of the business operation schedule table 42800. Finally, the management computer 40000 outputs results showing that the business operation schedule has been registered, and ends the business operation schedule input program 42100.

(2-3-3) Volume Allocation Command Program

The business operation administrator 80000 or the storage administrator 90000 uses the management computer 40000 to execute the volume allocation command program 42250, and uses the volume 20300 for the allocation to or allocation release from the host system 10000. Specifically, based on the I/O program 42300, a volume allocation screen H2000 as shown in FIG. 16 is output, and a volume 20300 allocation request is acquired from the business operation administrator 80000 or the storage administrator 90000.

The volume allocation screen H2000 is configured from a field H2050 for selecting a business ID, a field H2100 for selecting the host system 10000 of the allocation destination, a field H2150 for inputting the capacity of the volume 20300, a field H2200 for inputting a global volume ID for uniquely identifying the volume 20300 with the storage system, a registration button H2250 for registering the input information, and a cancel button H2300 for canceling the input. When the business operation administrator 80000 or the storage administrator 90000 pushes the registration button H2250, the management computer 40000 starts the volume allocation command program 42250 shown in FIG. 17 (step M1005).

Figure 17:
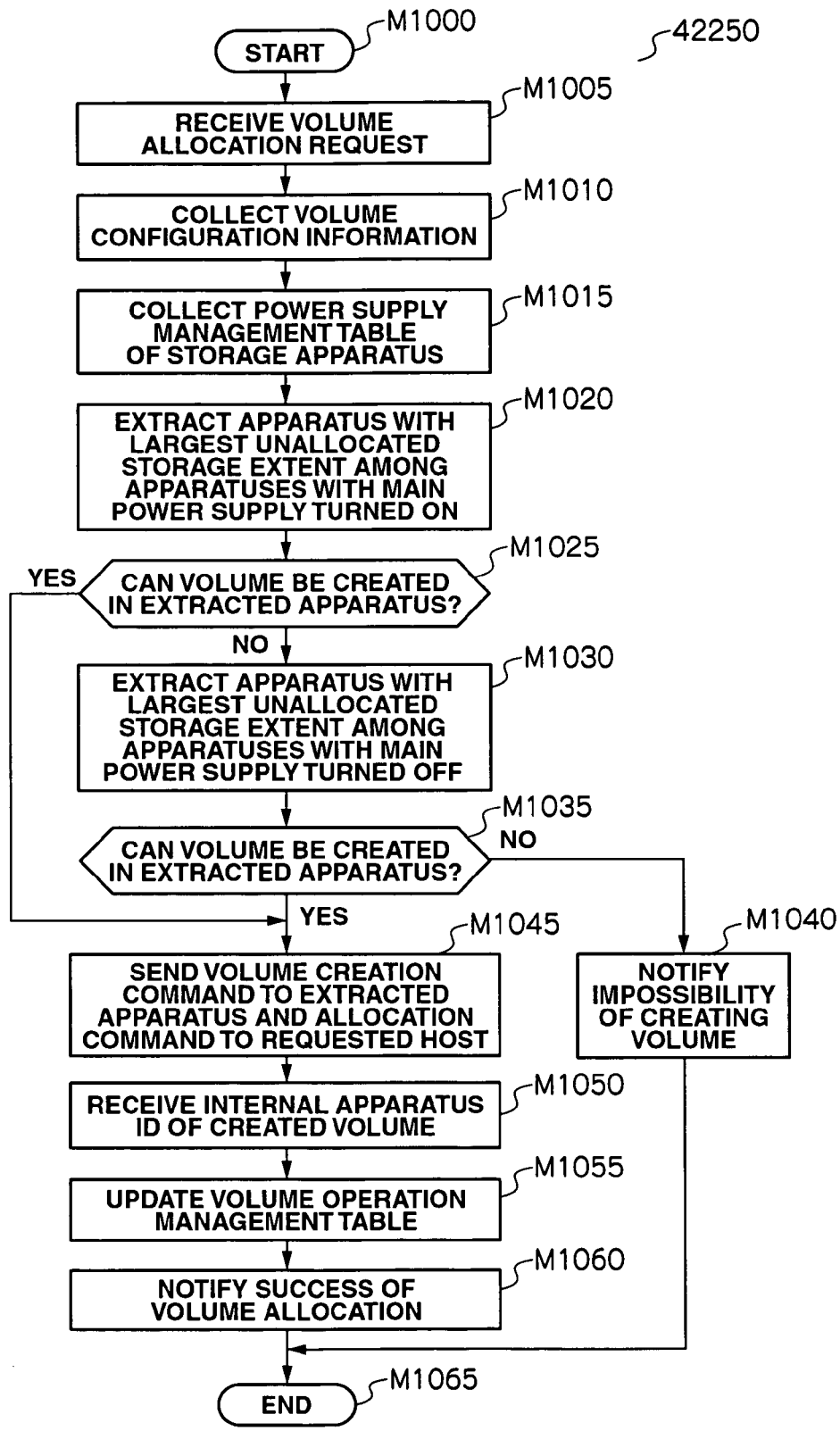
FIG. 17 is a detailed flowchart of the volume 20300 allocation command program 42250 according to an embodiment of the present invention.

FIG. 17 shows a flow when the volume allocation command program 42250 is executed. Foremost, the management computer 40000 receives a volume allocation request from the business operation administrator 80000 or the storage administrator 90000 (step M1005). Subsequently, the management computer 40000 requests the update of the volume configuration information table 42600 in order to collect volume configuration information (step M1010). Specifically, the management computer 40000 requests volume configuration information collection to the volume configuration information collection program 42200.

The management computer 40000 thereafter acquires the power supply management table 20550 provided to the storage apparatus 20000 to be managed (step M1015).

Subsequently, the management computer 40000 refers to the power supply management table 20550 and the unallocated storage extent management table 42500 acquired at step M1010, and extracts the storage apparatus 20000 among the storage apparatuses 20000 with the main power supply circuit 20700 turned on in which the capacity of the unallocated storage extent 20400 is largest (step M1020). The reason why extraction is performed preferentially from storage apparatuses 20000 with the main power supply circuit 20700 turned on is to thereafter collectively allocate the volumes operated with the storage apparatuses 20000 with the main power supply circuit 20700 turned on.

The management computer 40000 thereafter checks whether it is possible to create a volume 20300 having a capacity designated by the volume 20300 allocation request received at step M1005 in the storage apparatus 20000 extracted at step M1020 (step M1025). When a volume 20300 cannot be created at step M1025 [(step M1025: NO)], the management computer 40000 extracts the storage apparatus 20000 with the largest unallocated storage extent 20400 among the storage apparatuses 20000 with the main power supply circuit 20700 turned off (step M1030).

Subsequently, the management computer 40000 checks whether it is possible to create a volume 20300 having a capacity designated by the volume allocation request received at step M1005 in the storage apparatus 20000 extracted at step M1030 (step M1035). When the management computer 40000 is not able to create a volume 20300 at step M1035 (step M1035: NO), it notifies the impossibility of creating a volume 20300 (step M1040), and ends the volume allocation command program 42250. When the management computer 40000 is able to create a volume 20300 at step M1025 or step M1035 (step M1035: YES), it creates a volume 20300 having a capacity designated by the volume allocation request in the extracted storage apparatus 20000, and sends a command for allocating the created volume 20300 to the host system 10000 designated by the volume allocation request (step M1045).

The management computer 40000 receives an internal apparatus volume ID from the relevant storage apparatus 20000 (step M1050). The management computer 40000 thereafter adds the created volume 20300 to the volume operation management table 42700, and updates the volume operation management table 42700 (step M1055). Specifically, the [management computer 40000] adds the volume 20300 ID contained in the volume 20300 allocation request to the global volume ID field 42710 of the volume operation management table 42700, and registers the business ID contained in the volume allocation request in the business ID field 42720. Further, the [management computer 40000] registers the ID of the storage apparatus 20000 that commanded the creation of the volume 20300 at step M1025 in the corresponding storage apparatus 20600 ID field 42730, and registers the internal apparatus volume 20300 ID received at step M1050 in the volume ID field 42740.

Finally, the management computer 40000 outputs results showing that the volume 20300 has been successfully created (step M1060), and ends the volume allocation command program 42250 (step M1065). The foregoing is the flow of the allocation mode for allocating the volume 20300 to the host system 10000 based on the volume allocation command program 42250.

Figure 18:
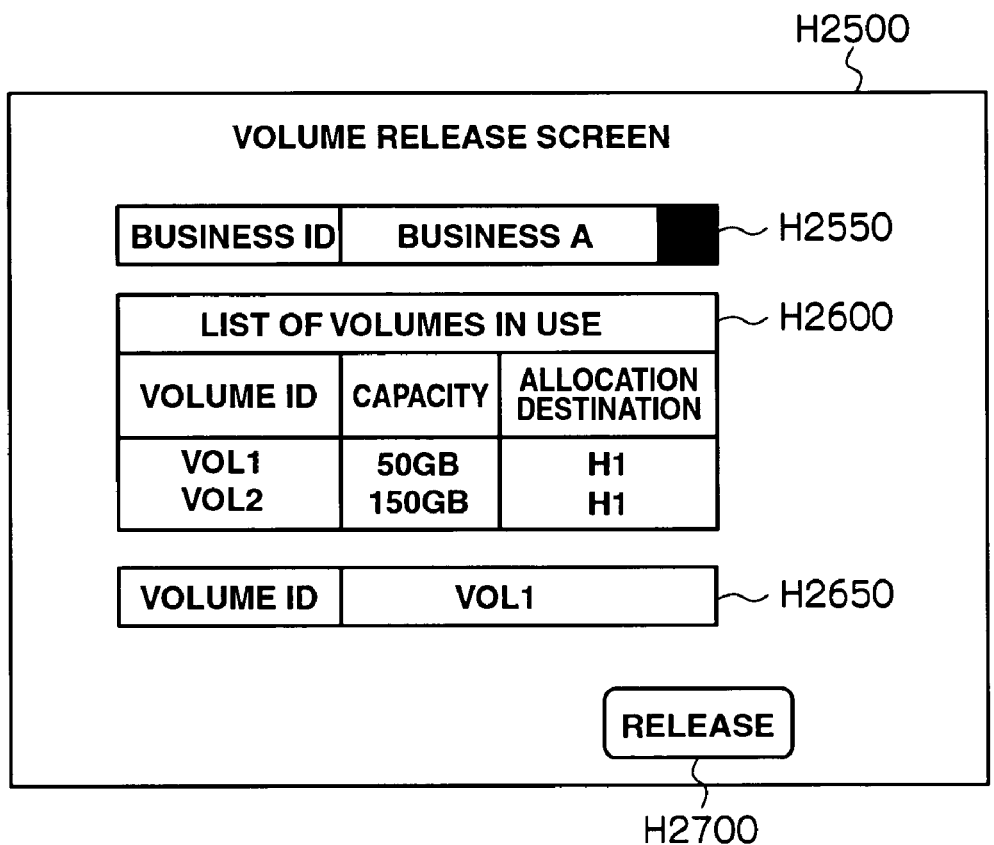
FIG. 18 is a diagram showing an exemplary I/O screen provided by the program.

The flow of the release mode for releasing the volume 20300 allocated to the host system 10000 based on the volume allocation command program 42250 will now be described. Foremost, the I/O program 42300 outputs a volume release screen H2500 as shown in FIG. 18, and acquires a volume 20300 release request from the business operation administrator 80000 or the storage administrator 90000. The volume release screen H2500 is configured from a field H2550 for selecting a business ID, a field H2600 for indicating the global volume ID, capacity and the host system 10000 of the volume allocation destination of the volume 20300 used in the selected business, a field H2650 for inputting the global volume ID of the volume 20300 to be released, and a release button H2700.

When the business operation administrator 80000 or the storage administrator 90000 pushes the release button H2700, the management computer 40000 starts the volume allocation command program 42250 in a release mode for releasing the volume 20300. Specifically, foremost, the management computer 40000 receives a volume 20300 release request from the business operation administrator 80000 or the storage administrator 90000.

Subsequently, the management computer 40000 extracts the value indicated by the global volume ID input to the input field H2650 of the volume release screen H2500 from the volume operation management table 42700. The management computer 40000 thereafter sends a command to the storage apparatus 20000 with the extracted storage apparatus ID for performing the allocation release of the extracted internal apparatus volume ID and registration in the unallocated storage extent 20400. Then, the management computer 40000 receives a notice from storage apparatus 20000 indicating the success of the volume allocation release and registration in the unallocated storage extent 20400. Finally, the management computer 40000 deletes the requested volume 20300 from the volume operation management table 42700, outputs a notice indicating the successful release of the volume 20300, and ends the processing.

(2-3-4) Power Supply Control Command Program (2-3-4-1) Outline of Power Supply Control Command Program The power supply control command program 42150 is periodically executed by the management computer 40000, or executed by the management computer 40000 based on a command from the storage administrator 90000. Flow of the power supply control command program 42150 is described using the flowcharts shown in FIG. 19 to FIG. 21.

Figure 19:
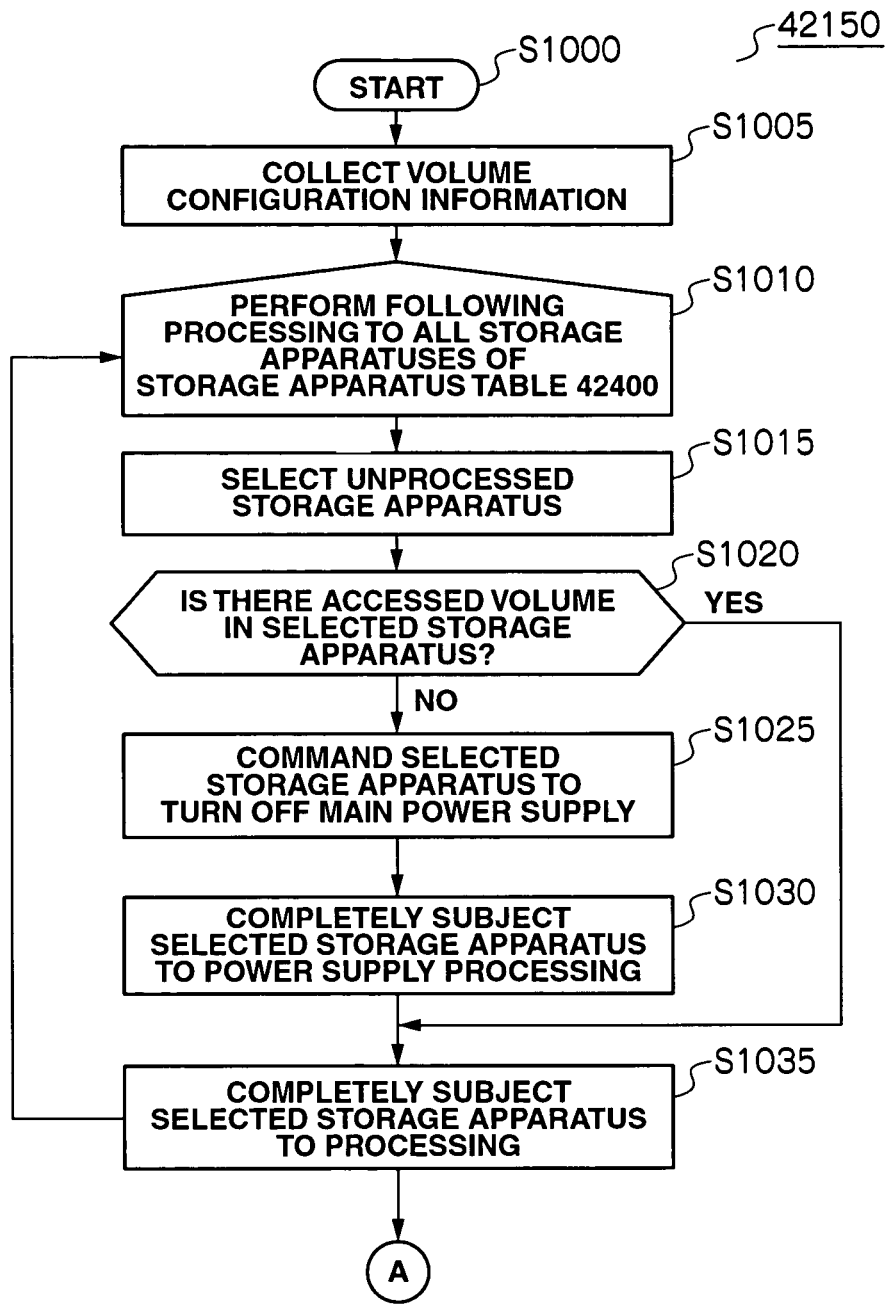
FIG. 19 is a detailed flowchart of the power supply control command program 42150 according to an embodiment of the present invention.

Foremost, the flow shown in FIG. 19 is described. The management computer 40000 executes the volume configuration information collection program 42200 in order to acquire volume configuration information, and updates the volume configuration information table 42600 in order to reflect the acquired volume configuration information (step S1005). Subsequently, the management computer 40000 executes step S1015 to step S1035 to all storage apparatuses 20000 in the storage apparatus table 42400 (step S1010). Foremost, the management computer 40000 selects an unprocessed storage apparatus 20000 (step S1015). The management computer 40000 thereafter refers to the business operation schedule table 42800, the volume operation management table 42700 and the volume configuration information table 42600, and checks whether it is possible to access the volume 20300 stored in the selected storage apparatus 20000 (step S1020).

Here, the management computer 40000 determines the access status of the volume 20300 based on the operation schedule information fixed in advance regarding the business and which is retained in the business operation schedule table 42800 shown in FIG. 14, and determines that the volume 20300 is accessed when the business using such volume 20300 is in operation, and determines that the volume 20300 is not accessed when the business is stopped. The management computer 40000 proceeds to step S1035 when there is an accessed volume 20300 in the storage apparatus 20000 selected at step S1020 (step S1020: YES). When there is no accessed volume 20300 in the storage apparatus 20000 selected at step S1020 (step S1020: NO), the management computer 40000 sends a command to the selected storage apparatus 20000 to turn off the main power supply circuit 20700 (step S1025).

Subsequently, the management computer 40000 completely subjects the selected storage apparatus 20000 to power supply processing (step S1030). The management computer 40000 thereafter completely subjects the selected storage apparatus 20000 to the processing at step S1020 (step S1035). When all corresponding storage apparatuses 20000 are completely subject to the processing at step S1020, the management computer 40000 executes the flow shown in FIG. 20. The management computer 40000 executes the processing from step S1045 to step S1100 to the storage apparatuses 20000 that have not been completely subject to power supply processing (step S1040).

The management computer 40000 selects a storage apparatus 20000 that has not been subject to the processing at step S1075 among the storage apparatuses 20000 that have not been completely subject to power supply processing, and makes this apparatus A (step S1045). The management computer 40000 executes step S1055 to step S1075 to the storage apparatuses 20000 that have not been completely subject to power supply processing and which are not apparatus A (step S1050). The management computer 40000 selects a storage apparatus that has not been subject to power supply processing, which is not apparatus A, and which has not been subject to the processing at step S1075, and makes this apparatus B (step S1055). The management computer 40000 checks whether it is possible to migrate all accessed volumes 20300 in apparatus A to apparatus B (step S1060).

When all volumes 20300 cannot be copied at step S1060 (step S1060: NO), the management computer 40000 checks whether it is possible to swap (exchange) all accessed volumes 20300 of apparatus A and the unaccessed volumes 20300 of apparatus B (step S1065). When the volumes 20300 can be copied at step S1060 (step S1060: YES), or when swapping is possible at step S1065 (step S1065: YES), the management computer 40000 makes apparatus B a migration destination apparatus candidate (step S1070).

When swapping is not possible at step S1065 (step S1065: NO), or after making apparatus B the migration destination [apparatus] candidate at step S1070, the management computer 40000 completely subjects apparatus B to the processing at step S1050 (step S1075). After the processing at step S1050, the management computer 40000 checks whether it is possible to decide the migration destination apparatus from the migration destination apparatus candidate (step S1080). Here, upon deciding the migration destination apparatus, when the total capacity of the accessed volume 20300 of the migration destination apparatus is greater than or equal to the total capacity of the accessed volume 20300 of apparatus A, and there are several corresponding migration destination apparatus candidates, a condition of using the apparatus with the largest capacity of the unallocated storage extent may also be adopted.

When the migration destination apparatus cannot be decided at step S1080 (step S1080: NO), the management computer 40000 completely subjects apparatus A to processing (step S1100). When the migration destination apparatus is decided at step S1080 (step S1080: YES), the management computer 40000 creates a volume 20300 having a capacity that is the same as the accessed volume 20300 of apparatus A in the migration destination apparatus, and sends a request to the volume migration execution program 70210 for copying all accessed volumes 20300 of apparatus A to the volume 20300 created in the migration destination apparatus. Or, the management computer 40000 sends a swap request to the volume migration computer 70000 for swapping the accessed volumes 20300 of apparatus A and the unaccessed volumes 20300 of the migration destination apparatus (step S1085).

Subsequently, the management computer 40000 sends a command to apparatus A for turning off the main power supply circuit 20700 (step S1090). The management computer 40000 thereafter completely subjects apparatus A to power supply processing (step S1095). Then, the management computer completely subjects apparatus A to the processing at step S1050 (step S1100). When all corresponding storage apparatuses 20000 are completely subject to the processing at step S1050, the management computer 40000 further executes the flow shown in FIG. 21. The management computer 40000 executes step S1110 to step S1150 to the storage apparatuses 20000 that have not been completely subject to the power supply processing (step S1105). The management computer 40000 selects an unprocessed storage apparatus 20000 (step S1110).

Subsequently, the management computer 40000 extracts a volume configuration management table 20530 from the selected storage apparatus 20000 (step S1115). The management computer 40000 thereafter extracts a disk management table 20540 from the selected storage apparatus 20000 (step S1120). Then, the management computer 40000 extracts a power supply management table 20550 from the selected storage apparatus 20000 (step S1125).

Subsequently, the management computer 40000 commands the selected storage apparatus 20000 to turn off the power supply of the disks 20001 other than those configuring the accessed volume 20300 (step S1130). Specifically, the management computer 40000 refers to the respective tables extracted at step S1115, step S1120 and step S1125, the volume operation management table 42700 and the business operation schedule table 42800, selects the disks 20001 other than those configuring the accessed volume 20300, and sends a command to the selected storage apparatus 20000 for turning off the power supply of the corresponding disks 20001.

The management computer 40000 commands the selected storage apparatus 20000 to turn off the power supply of the controller 20200 that does not have the accessed volume 20300 (step S1135). Specifically, the management computer 40000 refers to the respective tables extracted at step S1115, step S1120 and step S1125, the volume operation management table 42700 and the business operation schedule table 42800, selects a controller 20200 that does not have an accessed volume 20300, and sends a command to the selected storage apparatus 20000 for turning off the power supply of the corresponding controller 20200 (step S1135).

Subsequently, the management computer 40000 completely subjects the selected storage apparatus to processing (step S1140). When all corresponding storage apparatuses 20000 are completely subject to the processing at step S1105, the management computer 40000 ends the power supply control command program 42150 (step S1145).

(2-3-4-2) Explanation of Specific Power Supply Control Command Program

Figure 20:
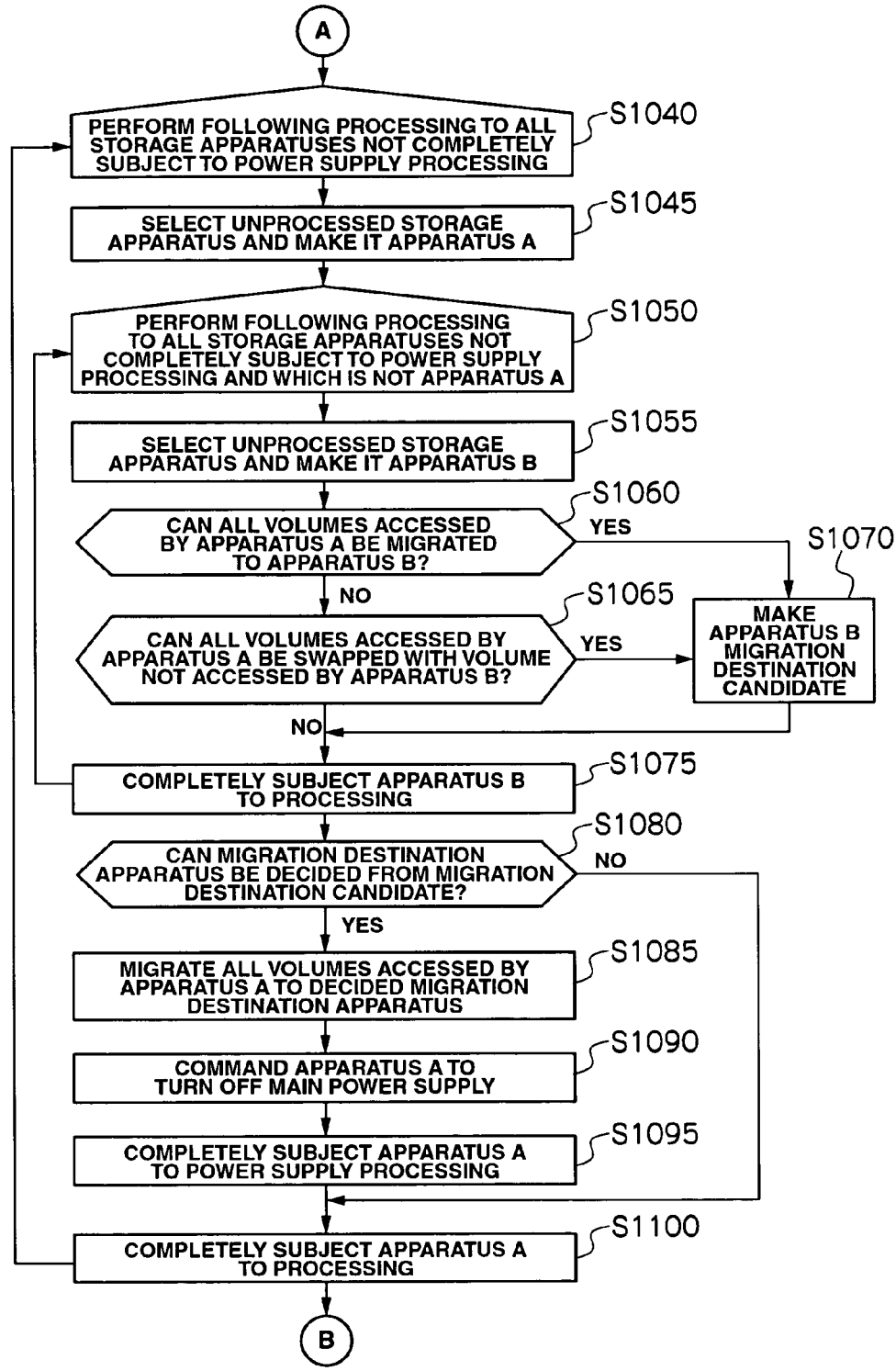
FIG. 20 is a detailed flowchart of the power supply control command program 42150 according to an embodiment of the present invention.
Figure 21:
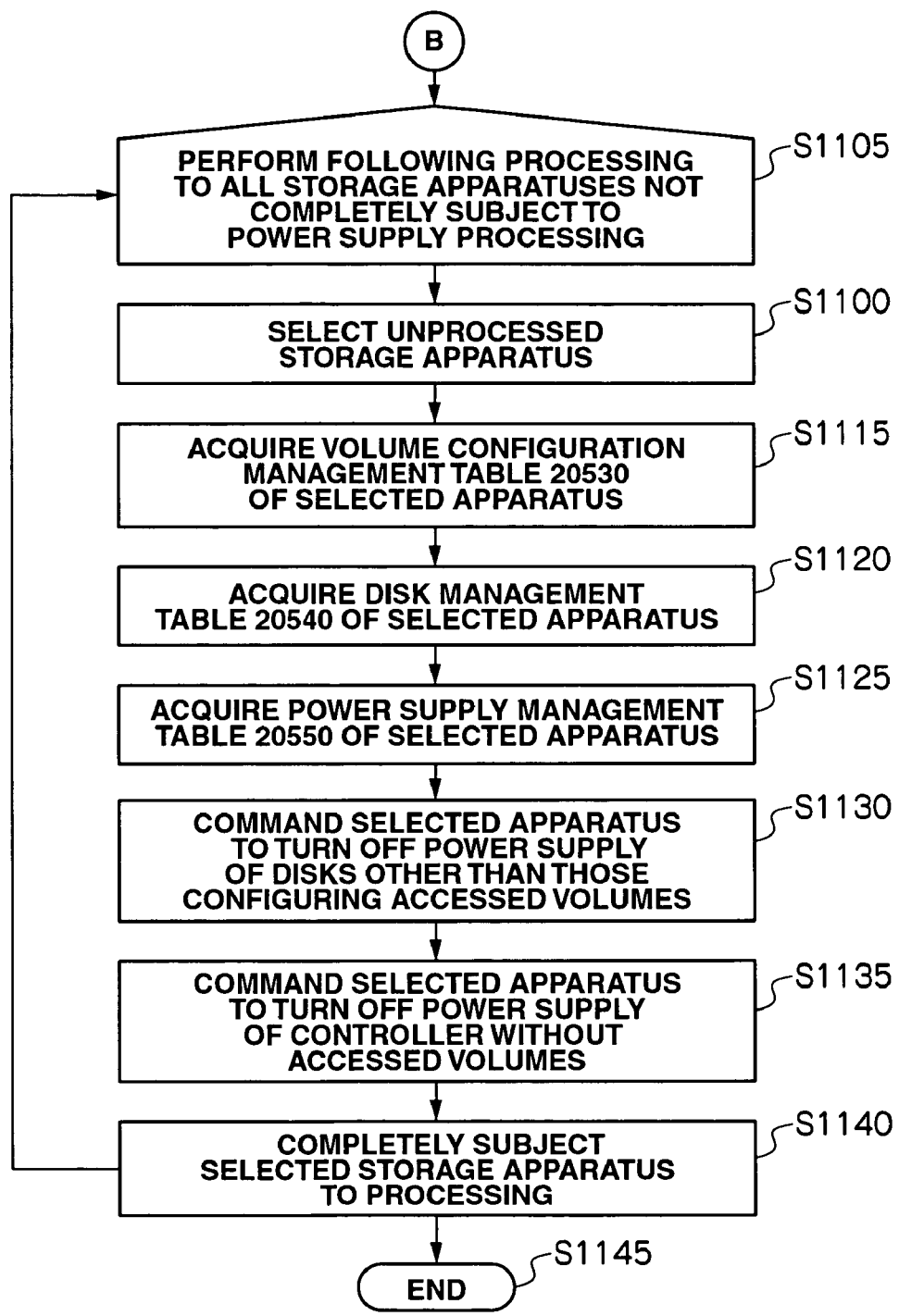
FIG. 21 is a detailed flowchart of the power supply control command program 42150 according to an embodiment of the present invention.

A specific example of the processing of the power supply control command program 42150 in the present embodiment will now be described in further detail based on the flow shown in FIG. 19 to FIG. 21. The configuration of the storage system in this embodiment shall be the configuration shown in FIG. 1, and all main power supply circuits 20700 of the storage apparatuses 20000 before the execution of the power supply control command program 42150 shall be turned on. Further, in the present embodiment, the management computer 40000 executes the power supply control command program 42150 upon referring to the business operation schedule after one day shown in FIG. 14.

Foremost, the management computer 40000 extracts a volume configuration management table 20530 from the storage apparatus 20000 to be managed in the storage apparatus table 42400 at step S1005 described with reference to FIG. 19, and updates the volume configuration information table 42600, the volume operation management table 42700, and the unallocated storage extent management table 42500. Here, the updated volume configuration information table 42600 is shown in FIG. 12, the updated volume operation management table 42700 is shown in FIG. 13, and the updated unallocated storage extent management table 42500 is shown in FIG. 11.

Further, FIG. 22 shows a storage apparatus status table R1000 showing list of the accessed volumes 20300, a list of the unaccessed volumes 20300, the unallocated storage extent capacity 20400 of the respective storage apparatuses and status of the main power supply circuit 20700 stored in the respective storage apparatuses 20000 before the execution of the power supply control command program 42150.

The management computer 40000 performs the processing at step S1010 to step S1035 described with reference to FIG. 19 (step S1010). Foremost, the management computer 40000 selects the unprocessed storage apparatus ST1 shown in FIG. 22 from the storage apparatus table 42400 (step S1015). Subsequently, the management computer 40000 checks whether an accessed volume 20300 is stored in the storage apparatus ST1 (step S1020). Specifically, the management computer 40000 extracts the operation status of business using the volumes VOL1 and VOL2 stored in the storage apparatus ST1 from the volume operation management table 42700 and the business operation schedule table 42800. Because the volumes VOL1 and VOL2 are used in business A but are stopped in business A, they are not stored as accessed volumes in the storage apparatus ST1.

Thus, the management computer 40000 sends a command to the storage apparatus ST1 for turning off the main power supply circuit 20700 (step S1025), and completely subjects the storage apparatus ST1 to power supply processing (step S1030). Subsequently, the management computer 40000 completely subjects the storage apparatus ST1 to the processing at step S1010 (step S1035), and returns to step S1010. The management computer 40000 thereafter similarly executes the processing at step S1015 to step S1035 to the remaining storage apparatuses ST2, ST3 and ST4 (step S1010). In the present embodiment, because an accessed volume 20300 is stored in the storage apparatuses ST2, ST3 and ST4, even after the processing at step S1010, the storage apparatuses ST2, ST3 and ST4 have not been subject to power supply processing.

Subsequently, the management computer 40000 proceeds to the flow shown in FIG. 20, and performs the processing at step S1040 to step S1100 shown in FIG. 20 with respect to the storage apparatuses ST2, ST3 and ST4 that have not been subject to power supply processing (step S1040). Foremost, the management computer 40000 selects the power supply processing unprocessed storage apparatus ST2 and makes it apparatus A (step S1045). The storage apparatus status table R1010 after the processing at step S1010 is shown in FIG. 23.

The management computer 40000 thereafter selects a storage apparatus 20000 to which all accessed volumes 20300 in apparatus A are to be migrated from a storage apparatus 20000 other than apparatus A and which has not been subject to power supply processing (step S1050). In the processing at step S1050, the management computer 40000 selects storage apparatus ST3 as a storage apparatus 20000 other than apparatus A and which has not been subject to power supply processing, and makes it apparatus B (step S1055). The management computer 40000 checks whether all accessed volumes 20300 in apparatus A can be migrated to apparatus B (step S1060). Here, the total capacity of the all accessed volumes 20300 of apparatus A; that is, of storage apparatus ST2 is 20 GB. Meanwhile, the capacity of the unallocated storage extent 20400 of apparatus B; that is, of storage apparatus ST3 is 100 GB, and exceeds 20 GB, which is the total capacity of all volumes 20300 of apparatus A.

Thus, because it is possible to migrate all accessed volumes 20300 in apparatus A to apparatus B at step S1060, the management computer 40000 makes apparatus B; that is, makes storage apparatus ST3 a migration destination candidate (step S1070). The management computer 40000 completely subjects apparatus B to the processing at step S1050 (step S1075). Further, the management computer 40000 returns to step S1050, selects the storage apparatus ST4 as the storage apparatus 20000 other than apparatus A, which has not been subject to power supply processing, and which has not been subject to the processing at step S1050, and then makes it apparatus B (step S1055). The management computer 40000 checks whether it is possible to migrate all accessed volumes 20300 in apparatus A to apparatus B (step S1060).

Here, the total capacity of all accessed volumes 20300 in apparatus A is 20 GB, and the capacity of the unallocated storage extent 20400 in apparatus B is 150 GB, and exceeds 20 GB, which is the total capacity of all volumes 20300 in apparatus A. Thus, because the management computer 40000 is able to migrate all accessed volumes 20300 in apparatus to apparatus B at step S1060, it makes apparatus B; that is, makes storage apparatus ST4 a migration destination candidate (step S1070). The management computer 40000 completely subjects apparatus B to the processing at step S1050 (step S1075). This implies that the management computer 40000 has performed the processing at step S1050 to all storage apparatuses 20000 that have not been subject to power supply processing other than apparatus A. FIG. 24A shows a migration destination candidate table R2000.

Subsequently, the management computer 40000 checks whether it is possible to decide the migration destination of apparatus A among the migration destination candidates extracted at step S1050 (step S1080). In the present embodiment, upon deciding the migration destination, when the total capacity of the accessed volume 20300 of the migration destination apparatus is greater than or equal to the total capacity of the accessed volume 20300 of the apparatus A at step S1080, and the total capacity of the accessed volumes 20300 are the same, an apparatus having a larger capacity of the unallocated storage extent 20400 will be given preference.

The management computer 40000 decides the storage apparatus ST4 to be the migration destination apparatus because the total capacity of the accessed volume 20300 in the storage apparatus ST4 is larger than apparatus A, and the capacity of the unallocated storage extent 20400 is larger than the storage apparatus ST3. Subsequently, the management computer 40000 selects an accessed volume 20300 in the apparatus A, and sends a command for creating a volume 20300 having the same capacity as the selected volume 20300 in the storage apparatus ST4 to become the migration destination apparatus. Specifically, the [management computer 40000] sends a command for creating a volume 20300 having a capacity that is the same as the volume in which the global volume ID is VOL3 in the storage apparatus ST4. Here, the internal apparatus volume ID of the created volume 20300 will be VOL002. After the creation of the volume 20300, the management computer 40000 sends the apparatus ID (ST2) and internal apparatus volume ID (VOL001) of VOL3 as the migration source volume, and the apparatus ID (ST4) of the migration destination volume and the internal apparatus volume ID (VOL002) of the migration destination volume 20300 to the volume migration computer 70000.

When the management computer 40000 receives a migration complete notice of the volume 20300 from the volume migration computer 70000, it sends a command to the migration source apparatus ST2 for releasing the allocation of the internal apparatus volume ID VOL001, and sends a command to the migration destination apparatus ST4 for allocating the internal apparatus volume ID VOL002 to the host system H2. The management computer 40000 registers the migration destination apparatus ST4 in the apparatus ID field 42730 of the row of VOL3 in the global volume ID field 42710 of the volume operation management table 42700. Further, the [management computer 40000] registers VOL002, which is the internal apparatus volume ID of the migration destination volume 20300, in the volume ID field 42740. The [management computer 40000] thereafter extracts a volume configuration management table 20530 from the storage apparatuses ST2 and ST3, and updates the volume configuration information table 42600 (step S1085).

Subsequently, the management computer 40000 sends a command to the storage apparatus ST2 in apparatus A for turning off the main power supply circuit 20700 (step S1090), and completely subjects apparatus A to power supply processing (step S1095). The management computer 40000 completely subjects apparatus A to the processing at step S1040 (step S1100), and then returns to step S1040. The storage apparatus status table R1020 after the foregoing processing is shown in FIG. 24B. The management computer 40000 selects the storage apparatus ST3 as the storage apparatus 20000 that has not been subject to power supply processing or the processing at step S1040 as apparatus A, and executes step S1040 to step S1100.

Foremost, the management computer 40000 selects the storage apparatus ST4 as the storage apparatus 20000 other than apparatus A that has not been subject to power supply processing or the processing at step S1050, and makes this apparatus B (step S1055). Subsequently, the management computer 40000 checks whether it is possible to migrate all accessed volumes 20300 in apparatus A to apparatus B (step S1060). Specifically, the capacity of the accessed volumes VOL5 in the storage apparatus ST3 is 100 GB, and the capacity of the unallocated storage extent 20400 in the storage apparatus ST4 is 130 GB. Thus, because the capacity of the unallocated storage extent 20400 in the storage apparatus ST4 exceeds 100 GB, which is the capacity of the accessed volume VOL5 in the storage apparatus ST3, and migration is possible, the storage apparatus ST4 is made a migration destination candidate (step S1070). The management computer 40000 completely subjects apparatus B to the processing at step S1050 (step S1075), and then returns to step S1050. Here, because there is no storage apparatus 20000 other than apparatus A that has not been subject to power supply processing or the processing at step S1050, the management computer 40000 executes step S1080.

The present invention provides a storage system capable of avoiding the consumption of excess power in a storage system configured from a plurality of storage apparatuses. The storage apparatus ST4 is the only migration destination candidate extracted at step S1050, the volume VOL5 is the only accessed volume 20300 of the storage apparatus ST3 having a capacity of 100 GB, and the volumes VOL3 and VOL7 are the accessed volumes 20300 of the storage apparatus ST4 having a total capacity of 120 GB. Thus, the storage apparatus ST4 will be used as the migration destination apparatus (step S1080). The migration destination apparatus candidate table R2010 created here is shown in FIG. 25A. The management computer 40000 migrates the volume VOL5 of the storage apparatus ST3 to the storage apparatus ST4 (step S1085), and thereafter sends a command to the storage apparatus ST3 for turning off the main power supply circuit 20700 (step S1090).

Subsequently, the management computer 40000 completely subjects the storage apparatus ST3 to power supply processing (step S1095), completely subjects the storage apparatus ST3 to the processing at step S1040 (step S1100), and then returns to step S1040. The storage apparatus status table R1030 after the foregoing processing is shown in FIG. 24B. The management computer 40000 selects the storage apparatus ST4 as the storage apparatus 20000 that has not been subject to power supply processing or the processing at step S1040, and makes it apparatus A (step S1045). The management computer 40000 thereafter executes step S1050. Here, because there is no storage apparatus 20000 other than apparatus A that has not been subject to power supply processing, and there is no storage apparatus 20000 that is not apparatus A and that has not been subject to power supply processing, the management computer 40000 executes step S1080, and checks whether it is possible to decide the migration destination apparatus from the migration destination candidates (step S1080). Because there is no migration destination candidate, the management computer 40000 determines that it is not possible to decide the migration destination candidate (step S1080: NO), completely subjects the storage apparatus ST4 to the processing at step S1040 (step S1100), and then returns to step S1040.

Because there is no storage apparatus 20000 that has not been subject to power supply processing or the processing at step S1040, the management computer 40000 executes step S1105 (step S1040). The management computer 40000 commands the storage apparatus 20000 that has not been subject to power supply processing to perform power supply control of the components in the storage apparatus 20000 (step S1105). Foremost, the management computer 40000 selects the storage apparatus ST4 that has not been subject to power supply processing or the processing at step S1105 (step S1110).

Figure 26:
FIG. 26 is a diagram showing a table representing the execution process of the power supply control command program 42150 according to an embodiment of the present invention.
Figure 27:
FIG. 27 is a diagram showing a table representing the execution process of the power supply control command program 42150 according to an embodiment of the present invention.

Subsequently, the management computer 40000 acquires a volume configuration management table 20530 from the storage apparatus ST4 (step S1115). The management computer 40000 thereafter acquires a disk management table 20540 from the storage apparatus ST4 (step S1120). Then, the management computer 40000 acquires a power supply management table 20550 from the storage apparatus ST4 (step S1125). The volume configuration management table 20530 acquired at step S1115 is shown in FIG. 26, the disk management table 20540 acquired at step S1120 is shown in FIG. 27, and the power supply management table 20550 acquired at step S1125 is shown in FIG. 28, respectively.

Subsequently, the management computer 40000 commands the storage apparatus ST4 to turn off the power supply of the disks other than those configuring the accessed volumes VOL3, VOL5 and VOL7 in the storage apparatus ST4 (step S1130). Specifically, the [management computer 40000] commands the storage apparatus ST4 to turn off the power supply of the DISK005, DISK006 and DISK007, which are disks that do not correspond to the array group AG1 configuring the volume VOL7, the array group AG2 configuring the volume VOL3, and the array group AG3 configuring the volume VOL5.

Subsequently, the management computer 40000 commands the storage apparatus ST4 to turn off the power supply of the controllers 20200 other than those controlling the accessed volumes VOL3, VOL5 and VOL7 in the storage apparatus ST4 (step S1135). Specifically, because the volumes VOL3, VOL5 and VOL7 belong to controller 0, and there is no controller 20200 other than controller 0, at step S1135, the management computer 40000 does not send a command to the storage apparatus ST4 for turning off the power supply of the controller 20200. The management computer 40000 thereafter completely subjects the storage apparatus ST4 to power supply processing (step S1140), and then returns to step S1105. Because there is no storage apparatus 20000 that has not been subject to power supply processing, the management computer 40000 ends the power supply control command program 20510 (step S1145). The foregoing was a specific example of the power supply control command program 20510 in the present embodiment.

(3) Effect of Present Embodiment

According to the present embodiment, because it is possible to migrate the volume 20300 in the storage apparatus 20000 to be accessed by the host system 10000 to another storage apparatus 20000, creates a storage apparatus 20000 that only has unaccessed volumes 20300, and to stop the supply of power to the main power supply circuit 20700 of the storage apparatus 20000, the present achieves an effect of being able to realize power saving in the overall storage system. Further, because it is also possible to stop the supply of power to the main power supply circuit 20700 of the storage apparatus 20000 based on the operation schedule information created in advance concerning the businesses of the host system 10000, the present invention also yields an effect of being able to realize power saving in the overall storage system.

Second Embodiment

In the first embodiment, a case was described where, in a storage system configured from a plurality of storage apparatuses 20000, the volume 20300 can be migrated to or exchanged with another storage apparatus 20000, and power supply of the main power supply circuit 36000 of the storage apparatus 20000 can be turned off based on the business operation schedule using the volume 20300 in the storage apparatus. In the present embodiment, the power supply control of a storage apparatus 20000 is described in a storage system having a storage controller 30000 comprising a function of providing a volume 20300 of another storage apparatus 20000 as one's own volume 20300 to the host system 10000.

(1) Configuration of Storage System in Second Embodiment

Figure 29:
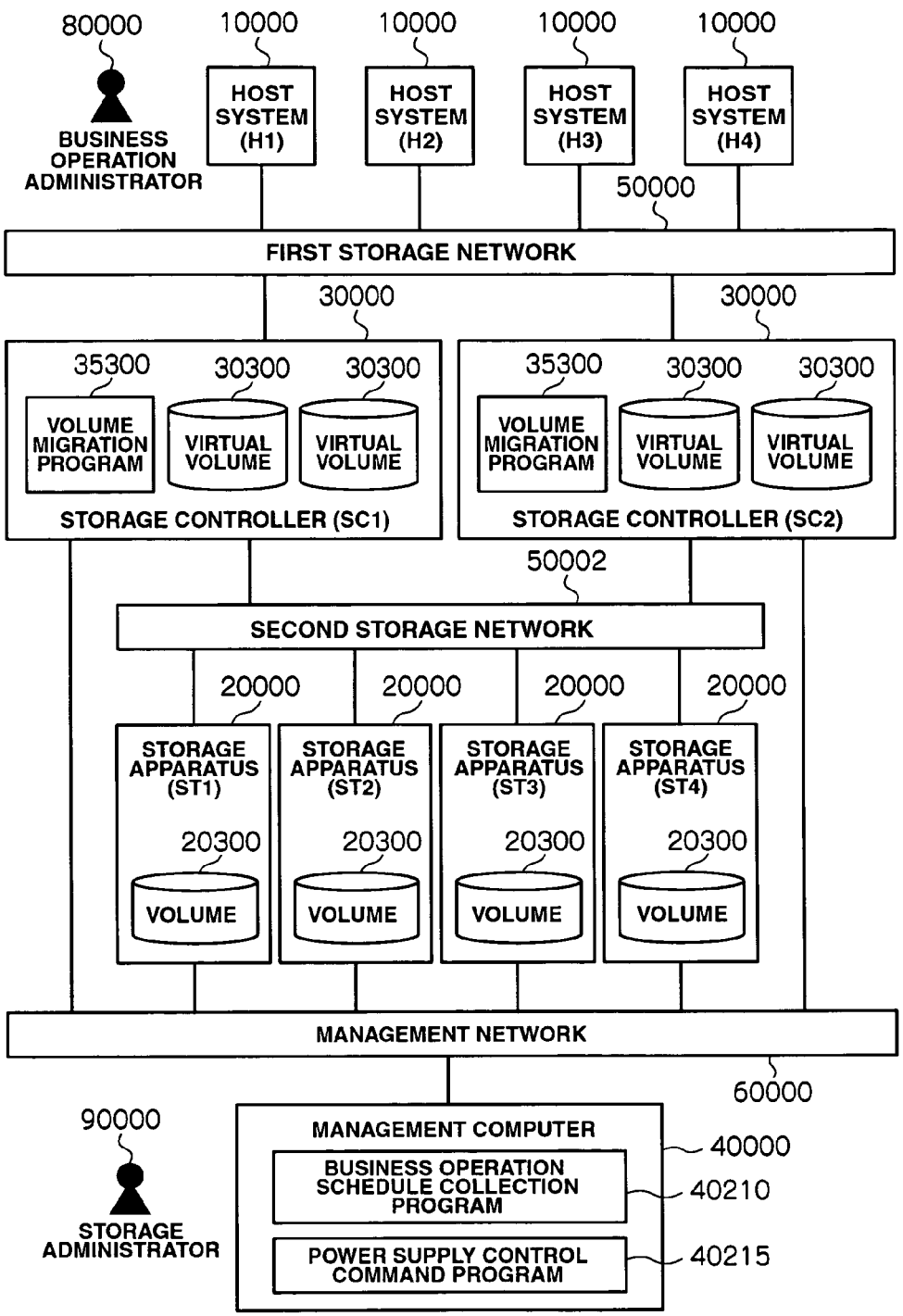
FIG. 29 is a diagram showing a configuration example of the storage system according to another embodiment of the present invention.
Figure 30:
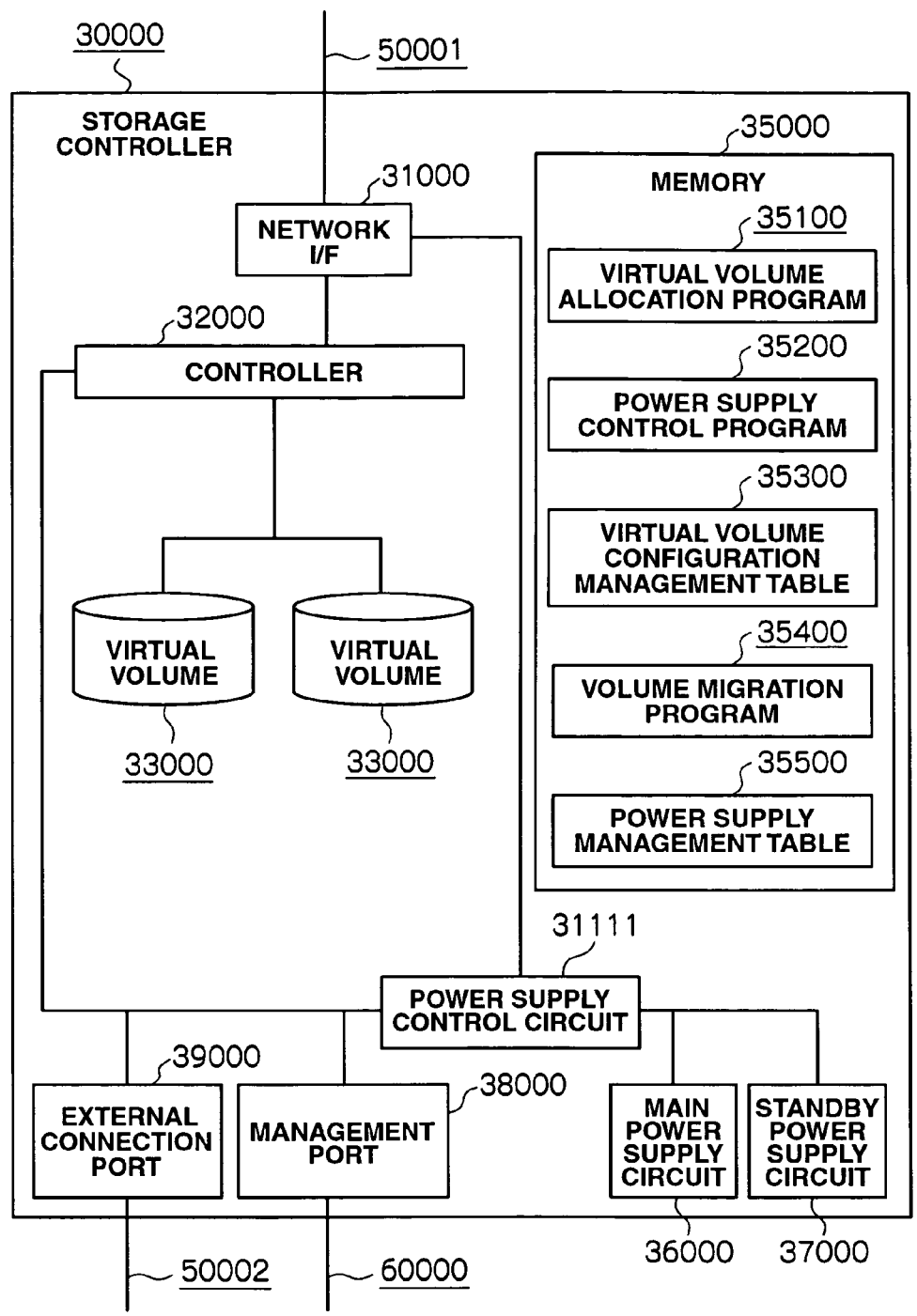
FIG. 30 is a diagram showing a detailed exemplary configuration of the storage controller 30000 according to another embodiment of the present invention.
Figure 31:
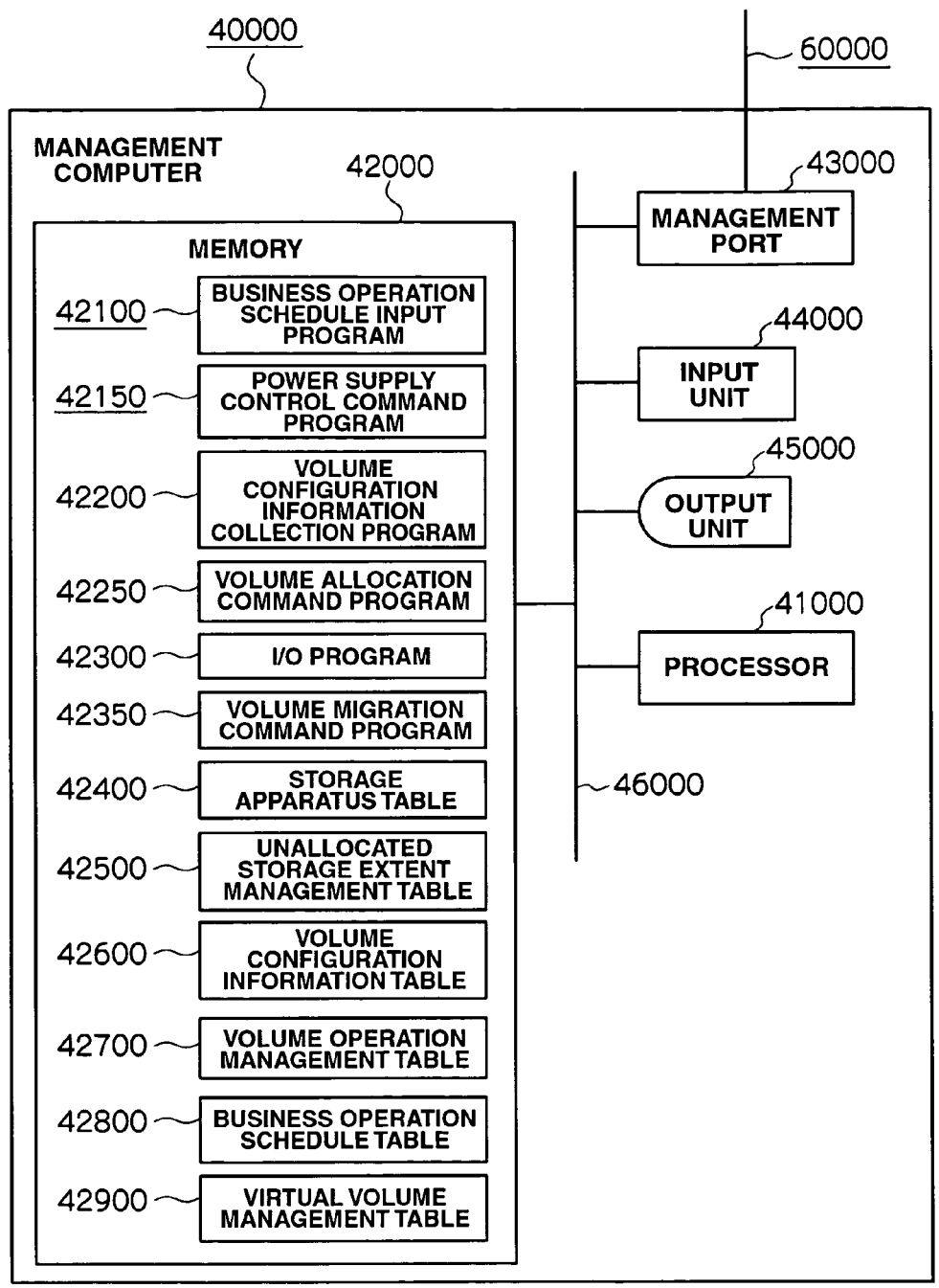
FIG. 31 is a diagram showing a detailed exemplary configuration of the management computer 40001 according to another embodiment of the present invention.

Configuration of the storage system according to a second embodiment will now be described. FIG. 29 to FIG. 31 show the configuration of the storage system and the configuration of the apparatuses connected to the storage system, and FIG. 32 to FIG. 37 show management information loaded in the respective apparatuses. Foremost, the differences between the present embodiment and the first embodiment are described. The first difference is that the first embodiment executed the migration of the volume 20300 between the storage apparatus 20000 with the volume migration computer 70000 in the storage area network 50000, whereas the present embodiment executes the migration of the volume 20300 between the storage apparatuses 20000 using the volume migration program 35300 provided in the storage controller 30000.

The second difference is in the configuration of the added storage controller 30000 in the present embodiment. This is described in detail below. For the sake of convenience in the following explanation, the volume 20300 of another storage apparatus 20000 provided as one's own volume by the storage controller 30000 having a function of providing such volume 20300 as one's own volume 20300 to the host system 10000 is referred to as a virtual volume 30300, and the actual volume of the other storage apparatus 20000 is referred to as a real volume.

FIG. 29 shows the configuration of the storage system. One or more host systems 10000 and one or more storage controllers 30000 using one or more virtual volumes 30300 are connected via a first storage area network 50001. Further, the storage controller 30000 and one or more storage apparatuses 20000 are connected via a second storage area network 50002. Moreover, the storage controller 30000 and the storage apparatus 20000 are connected to a management computer 40001 via the management network 60000.

Here, the virtual volume function provided to the storage controller 30000 is described. In recent years, as technology for alleviating the burden of the administrator in charge of allocating the volumes 20300, for instance, there is technology disclosed in the specification of European Patent Laid-Open Publication No. 2351375. According to this patent document, an apparatus referred to as a storage server comprises the following three functions. Namely, 1) a function of the storage server detecting the volumes of the respective storage systems, and managing them as unallocated storage extents of one's own storage server; 2) a function of creating a virtual volume (hereinafter referred to as a "virtual volume") in the storage server based on one or more volumes in the unallocated storage extent and allocating the virtual volume to the host system; and 3) a function of sequentially converting the data access from the host system to the virtual volume into the address of the actual volume configuring the virtual volume and responding to the data access from the host system by relaying such data access.

As a result of using an apparatus equipped with this kind of virtual volume function, a host system user or a general storage administrator will be able to allocate volumes (VOL) by simply focusing on the apparatus equipped with such virtual volume function, and the burden on the administrator concerning volume allocation can be alleviated. In the present embodiment, although the first storage area network 50001 and the second storage area network 50002 are separated, these may actually be the same storage area network. Nevertheless, the host system 10000 can only use the volume 20300 of the storage apparatus 20000 via the virtual volume 30300 of the corresponding storage controller 30000.

For the sake of convenience in the following explanation, in the second embodiment, as shown in FIG. 29, the host systems H1, H2, H3 and H4 are connected to a storage controller SC1 via the first storage area network 50001. Further, the storage controller SC1 is connected to the storage apparatuses ST1, ST2, ST3 and ST4 via the second storage area network 50002. Here, the first storage area network 50001 and the second storage area network 50002 are networks using the FC (Fibre Channel) protocol, and the management network 60000 is a network using the IP protocol. Moreover, the storage administrator 90000 uses the management computer 40001 to manage the storage controller 30000 and the storage apparatus 20000, and the business operation administrator 90000 uses the host system 10000 to manage the operation of business. The detailed configuration example of the host system 10000 is the same as the first embodiment, and the explanation thereof is omitted.

FIG. 30 shows a detailed configuration example of the storage controller 30001. The storage controller 30000 has one or more network interfaces 31000 for connecting to the first storage area network 50001, one or more external connection ports 39000 for connecting to the second storage area network 50002, a management port 38000 for connecting to the management network 60000, one or more virtual volumes 33000 that incorporated the volumes of the storage apparatus 20000 via the external connection port 39000, and a power supply control circuit 31111 for controlling the power supply of components in the storage controller 30000, and these are connected to and controlled by the controller 32000.

The storage controller 30000 also has a main power supply circuit 36000 for supplying power to components in the storage controller 30000, and a standby power supply circuit 37000 for supplying to the controller 32000 and memory 35000 the power required to execute the respective programs in the memory 35000 when the main power supply circuit 36000 is turned off, and these are connected to the power supply control circuit 31111 for controlling the on and off of the power supply.

The memory 35000 stores a power supply control program 35200 for executing a power supply control request in the storage controller 30000 issued from the management computer 40001, a virtual volume allocation program 35100 for executing the creation and deletion request of the volume 33000 and allocation request to the host system 10000 issued from the management computer 40001, a virtual volume management table 35300 for retaining the connection relation of the virtual volume 33000 and the volume of the storage apparatus 20000, and the allocation to the host system 10000, and a volume migration program 35400 for migrating the volume of the storage apparatus 20000 to another storage apparatus 20000. The respective programs and respective tables are loaded from a storage medium such as a hard disk (not shown) upon activation of the storage apparatus 20000, and processed by the controller 32000. The detailed configuration example of the storage apparatus 20000 is the same as the first embodiment, and the explanation thereof is omitted.

FIG. 31 shows a detailed configuration example of the management computer 40001. The management computer 40001 has a processor 41000, a memory 42000, a management port 43000 for connecting to the management network 60000, an output unit 45000 such as a display apparatus for outputting the processing results, and an input unit 44000 such as a keyboard or a mouse, and these are mutually connected via an internal bus 46000. The memory 42000 stores a business operation schedule input program 42100 described below, a power supply control command program 42150, a volume configuration information collection program 42200, a volume allocation command program 42250, an I/O program 42300, a volume migration command program 42350, a storage apparatus table 42400 for specifying the storage apparatus to be managed, an unallocated storage extent management table 42500 for retaining the unallocated storage extent 20400 of the storage apparatus 20000 to be managed, a volume configuration information table 42600 for retaining the configuration information of the allocated volume 20300 of the storage apparatus to be managed, a volume operation management table 42700 for retaining the volume to be used in the business carried out by a user using the host system 10000, a business operation schedule table 42800 for retaining the business operation schedule, and a virtual volume management table 42900 for retaining the connection information of the virtual volume 33000 of the storage controller 30000 and the volume 20300 of the storage apparatus 20000.

The respective programs and respective tables are realized by the processor 41000 executing these upon loading them from a storage medium such as a hard disk (not shown) to the memory 42000. Further, although not shown, an OS (Operating System) is loaded from the storage medium to the memory 42000, and the processor 41000 executes the respective programs.

FIG. 32A is an example of the virtual volume configuration management table 35300 showing a configuration of the virtual volume 33000 provided to the storage controller 30000. The virtual volume configuration management table 35300 is configured from a field 35310 for registering the ID of a virtual volume 33000 that can be uniquely identified in the storage controller 30000, a field 35320 for registering the capacity of the virtual volume 33000, a field 35330 for registering the allocation destination host system of the virtual volume 33000, a field 35340 for registering a controller ID that can be uniquely identified in the apparatus of the controller 32000 controlled by the virtual volume 33000, a field 35350 for registering an external connection port ID for uniquely identifying the external connection port 39000 to which the real volume 20300 of the virtual volume 33000 is allocated, and a field 35360 for registering information of the real volume 20300 of the virtual volume 33000.

Here, as shown in FIG. 32B, the field 35360 for registering information of the real volume corresponding to the virtual volume 33000 is configured from a field 35361 for registering the storage apparatus 20000 having the real volume 20300 corresponding to the virtual volume 33000, and a field 35362 for registering an ID of the volume 20300 capable of uniquely identifying the real volume 20300 in the storage apparatus 20000. Here, FIG. 32A shows the virtual volume management table 35300 of the storage controller SC1, and FIG. 32B shows the virtual volume management table 35300 of the storage controller SC2 according to the present invention.

FIG. 33 shows an example of the power supply management table 35500 for managing the power supply status of components in the storage apparatus 20000 provided to the storage controller 30000. The power supply management table 35500 is configured from a field 35501 for registering a component ID that can be uniquely identified with the storage controller 30000 of the component, and a field 35502 for registering the power supply status. The power supply management table 35500 is updated with the power supply control program 35200 in the storage controller 30000. FIG. 34, FIG. 35, FIG. 36 and FIG. 37 show an example of the respective table loaded in the management computer 40001. Incidentally, the unallocated storage extent management table 42500 and the business operation schedule table 42800 loaded in the management computer 40001 are of the same configuration as the unallocated storage extent management table 42500 and the business operation schedule table 42800 loaded in the management computer 40000 of the first embodiment, and the explanation thereof is omitted in the present embodiment.

FIG. 34 is an example of the storage apparatus table 42400 for the management computer 40001 to specify the storage apparatus 20000 to be managed. The storage apparatus table 42400 is configured from a field 42410 for registering a storage apparatus ID as an identifier for uniquely identifying the apparatus to be managed in the management computer 40001, a field 42420 for registering the type of apparatus, a field 42430 for registering apparatus identifying information such as the vendor name, model name or serial number of the apparatus to be managed for uniquely specifying the apparatus, and a field 42440 for registering an IP address of the management port for connecting to the management port of the apparatus to be managed.

Incidentally, the foregoing information may also be pre-registered from the management computer 40001 by the storage administrator 90000 handling the management computer 40001. Such information may also be automatically created using a name service or the like on the first storage area network 50001, the second storage area network 50002 or the management network 60000.

FIG. 35 is an example of the volume configuration information table 42600 showing the configuration of the volume 20300 in the storage apparatus. The difference with the first embodiment is in the addition of an apparatus; namely, the storage controller 30000. In addition to an apparatus ID of the storage controller 30000 being registered in the apparatus ID field 42610, information corresponding to the storage controller 30000 is also registered in the field 42620 for registering the internal apparatus volume ID, the field 42630 for registering the capacity, the field 42640 for registering the allocation destination host system, and the field 42650 for registering the controller ID. Further, when the apparatus is a storage controller 30000, an external connection port ID that can be uniquely identified in the storage controller 30000 of the external connection port 39000 to which the real volume 20300 is allocated is registered in the array group field 42660.

FIG. 36 is an example of the volume operation management table 42700 for managing the business using the host system 10000 and the virtual volume 33000 used in the business. The volume operation management table 42700 is configured from a field 42710 for registering a global volume ID for the management computer 40001, the business operation administrator 80000 and the storage administrator 90000 to uniquely identify the volume 20300, a field 42720 for registering a business ID for the management computer 40001, the business operation administrator 80000 and the storage administrator 90000 to uniquely identify the business to use the volume 20300, and a field 42730 for registering information regarding the virtual volume 33000.

Here, the field 42730 for registering the virtual volume information is configured from a field 42731 for registering a storage controller ID capable of uniquely identifying the storage controller 30000 with the storage system, and a field 42732 for registering a virtual volume ID capable of uniquely identifying the virtual volume in the storage controller.

FIG. 37 is an example of the virtual volume management table 42900 for managing the configuration of the virtual volume 33000 controlled by the storage controller 30000. The virtual volume management table 42900 is configured from a field 42910 for registering a storage controller ID for the management computer 40001 to uniquely identify the storage controller 30000 with the storage system, a field 42920 for registering a virtual volume ID for uniquely identifying the virtual volume 33000 in the storage controller, and a field 42930 for registering information regarding the real storage apparatus 20000 of the virtual volume 33000.

Here, the field 42930 for registering the real storage apparatus information of the virtual volume is configured from a field 42931 registering an apparatus ID for the management computer 40001 to uniquely identify the storage apparatus 20000 storing the real volume 20300 of the virtual volume 33000 in the storage system, and a field 42932 for registering a volume ID in the storage apparatus 20000.

(2) Detailed Explanation of Programs in Second Embodiment (2-1) Programs Loaded in Storage Controller Flow of the program executed by the storage controller 30000, the virtual volume 33000 allocation program 35100, the power supply control program 35200 and the volume migration program 35400 in the second embodiment will now be described. The virtual volume allocation program 35100 is a program performing, based on a command from the management computer 40001, the association and association release of the real volume 20300 of the storage apparatus 20000 connected to the external connection port 39000 via the second storage area network 50002, the allocation and allocation release of the virtual volume 33000 to and from the designated host system 10000, and modification of the real volume 20300 of the existing virtual volume 33000 to another real volume 20300, and is executed by the controller 32000 in the storage controller 30000.

Specifically, when the controller 32000 in the storage controller 30000 receives a request from the management computer 40001 for creating a virtual volume 33000, it registers a new virtual volume ID in the virtual volume configuration management table 35300, further registers the designated real volume 20300 in the real storage information field 35360 of the newly registered virtual volume ID, registers the ID of the controller to be used in the field 35340 for registering a controller ID that can be uniquely identified in the apparatus of the controller 32000 controlling the virtual volume 33000, registers the ID of an external port in the field 35350 for registering an external connection port ID for uniquely identifying the external connection port 39000 to which the real volume 20300 of the virtual volume 33000 is allocated, registers the capacity of the real volume 20300 in the field 35320 for registering the capacity of the virtual volume 33000, and then ends the virtual volume allocation program 35100.

Further, when the storage controller 30000 receives an allocation request from the management computer 40001 for allocation to the host system 10000 of the virtual volume 33000, it registers the designated host system 10000 in the allocation destination field 35330 of the designated virtual volume ID of the virtual volume configuration management table 35300, and ends the virtual volume allocation program 35100. Moreover, when the virtual volume allocation program 35100 receives a command from the management computer 40001 for changing the real volume 20300, it changes the real storage information field 35360 of the virtual volume configuration management table 35300 into the designated real volume 20300, and ends the virtual volume allocation program 35100.

The power supply control program 35200 is executed by the controller 32000 by the storage controller 30000 receiving a power supply control request sent from the management computer 40001 via the management network 60000. Specifically, when the storage controller 30000 receives a power supply control request, the controller 32000 sends a control signal to the power supply control circuit 31111 in order to make the power supply of the component indicated in the power supply control request the designated status. Thereafter, the controller 32000 rewrites the power supply status field 35502 in the power supply management table 35500 of the component designated in the power supply control request as a status designated in the request, updates the power supply management table 35500, and reflects the update of the power supply status of the component in the apparatus.

Further, when a data access request is sent from the host system 10000 or another storage controller 30000 to the virtual volume 33000, the controller 32000 executes the power supply control program 35200, sends a control signal for turning on the main power supply circuit 36000 to the power supply control circuit 31111 when the main power supply circuit 36000 is turned off, sends a control signal for turning on the power supply of the external connection port 39000 related to the corresponding virtual volume 33000 to the power supply control circuit 31111, and rewrites the power supply status field 35502 of the power supply management table 35500 of the component in which the power supply status was changed in the foregoing processing to a status after the control signal has been sent.

The volume migration program 35400 is a program for copying the data of the migration source virtual volume 33000 to the migration destination virtual volume 33000 or swapping the data of the migration source virtual volume 33000 and the data of the migration destination virtual volume 33000 based on a command from the management computer 40001, and is executed by the controller 32000. Specifically, when copying is commanded, the first block to the last block of the migration source virtual volume 33000 is copied to (replicated in) the migration destination virtual volume 33000.

When swapping is commanded, the blocks of the migration source virtual volume 33000 and the migration destination virtual volume 33000 are swapped (exchanged) from the first block. Further, when a virtual volume 33000 of another storage controller 30000 is commanded to the migration destination virtual volume 33000, copying and swapping are performed based on the reading and writing of data of the virtual volume 33000 between the storage controllers 30000 via the second storage area network 50002.

(2-2) Programs Loaded in Management Computer (2-2-1) Volume Configuration Information Collection Program Flow of the programs to be executed by the management computer 40001 in the second embodiment will now be described with reference to FIG. 38 to FIG. 44. In the present embodiment, programs having a different flow in comparison to the first embodiment; namely, the volume configuration information collection program 42200, the volume allocation command program 42250, and the power supply control command program 42150 will be described. Foremost, the volume configuration information collection program 42200 (flow not shown) is described, and explanation of the flow that is the same as the first embodiment will be omitted.

The volume configuration information collection program 42200 is a program to be periodically executed by the management computer 40001, or executed by the management computer 40001 based on a command from the storage administrator 90000 or a command from another program loaded in the management compute 40001 for collecting configuration information of the volume from a storage apparatus 20000 to be managed and collecting configuration information of a virtual volume 33000 from the storage controller 30000 to be managed. Specifically, a configuration information acquisition command is issued to the apparatuses configuring the storage apparatus registered in the storage apparatus table 42400 using an IP address in the IP address field 42440 of such apparatus, and, for instance, if the type of apparatus is a storage apparatus 20000, the value of the volume configuration management table 20530 loaded in the storage apparatus 20000 is acquired.

The management computer 40001 copies the acquired value of the volume configuration management table 20530 to the respective fields corresponding to the volume operation management table 42700 in the management computer 40001. Meanwhile, the volume configuration information collection program 42200 copies the acquired value of the unallocated storage extent 20400 shown in the volume configuration management table 20530 to the respective fields corresponding to the unallocated storage extent management table 42500.

The type of apparatus is a storage controller 30000, the management computer 40001 acquires the value of the virtual volume configuration management table 35300 loaded in the storage controller 30000. Subsequently, the management computer 40001 copies the acquired value of the virtual volume configuration management table 35300 to the respective corresponding fields of the virtual volume management table 42900 and the volume configuration management table 20530 in the management computer 40001. By using this program, the management computer 40001 is able to keep the value of the volume configuration information of the storage apparatus 20000 to be managed up to date, and keep the value of the virtual volume configuration information up to date.

(2-2-2) Volume Allocation Command Program

The business operation administrator 80000 or the storage administrator 90000 uses the volume allocation command program 42250 for the allocation or allocation release of the volume 20300 to or from the host system, and this program is executed by the management computer 40001. The I/O program 42300 outputs the volume allocation screen H2000 as shown in FIG. 16 described in the first embodiment, and acquires a volume allocation from the business operation administrator 80000 or the storage administrator 90000.

The volume allocation screen H2000 is configured from a field H2050 for selecting a business ID, a field H2100 for selecting the allocation destination, a field H2150 for inputting the capacity of the volume 20300, a field H2200 for inputting a global volume ID for uniquely identifying the volume 20300 with the storage system, a registration button H2250 for registering the input information, and a cancel button H2300 for canceling the input. When the business operation administrator 80000 or the storage administrator 90000 pushes the registration button H2250, the management computer 40001 starts the volume allocation command program 42250 in a volume allocation mode for allocating the volume.

Figure 38:
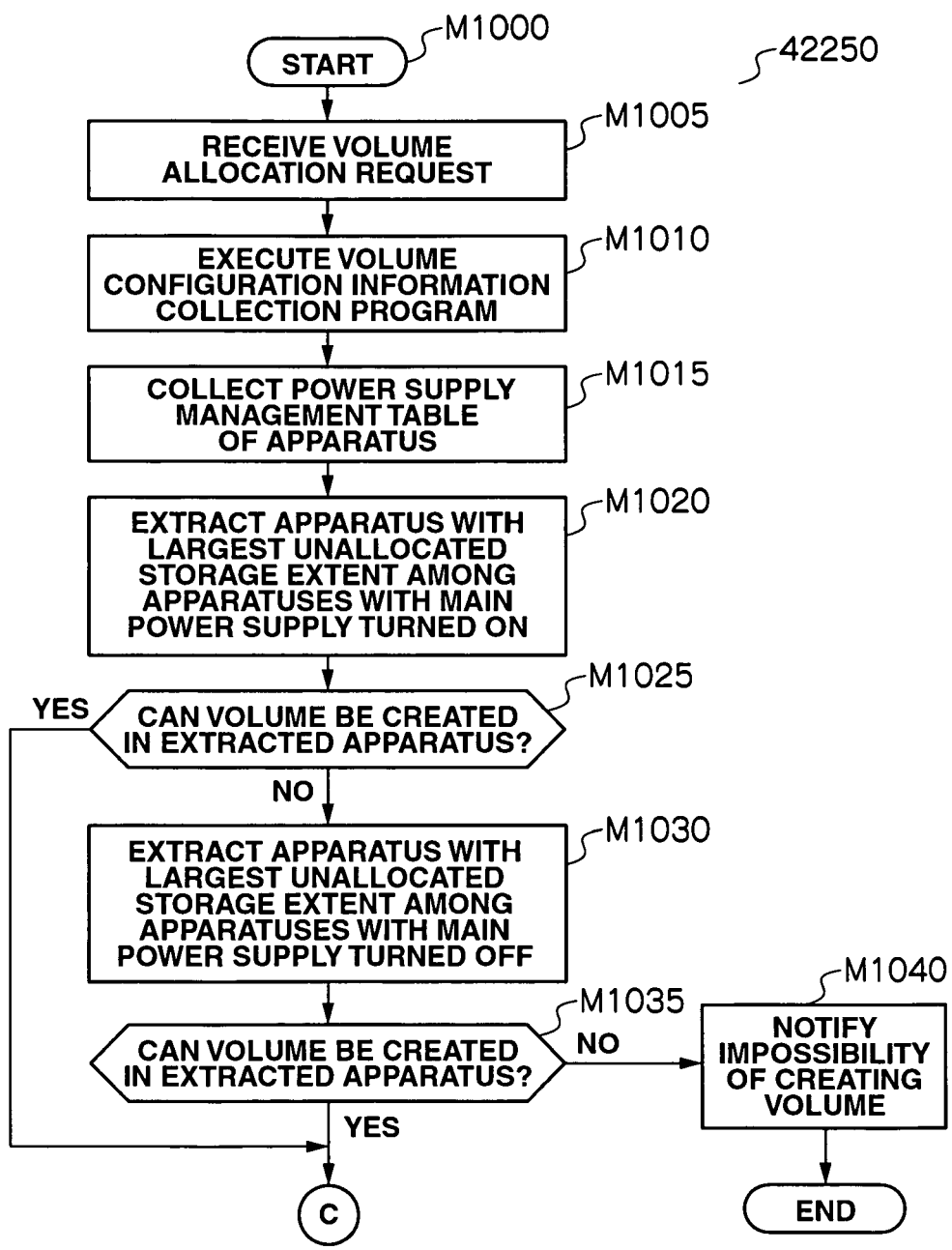
FIG. 38 is a detailed flowchart of the volume allocation command program 42250 according to another embodiment of the present invention.
Figure 39:
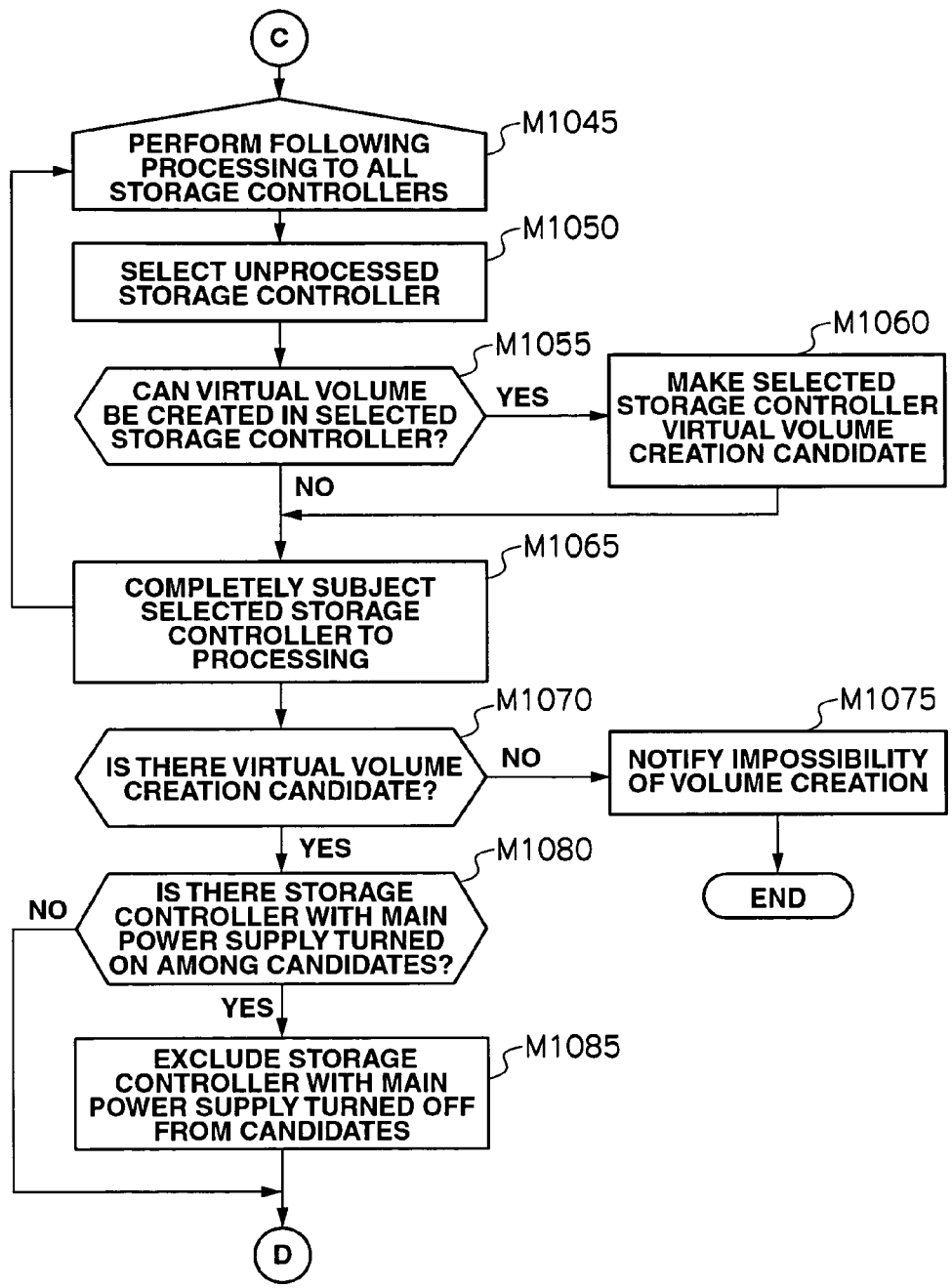
FIG. 39 is a detailed flowchart of the volume allocation command program 42250 according to another embodiment of the present invention.
Figure 40:
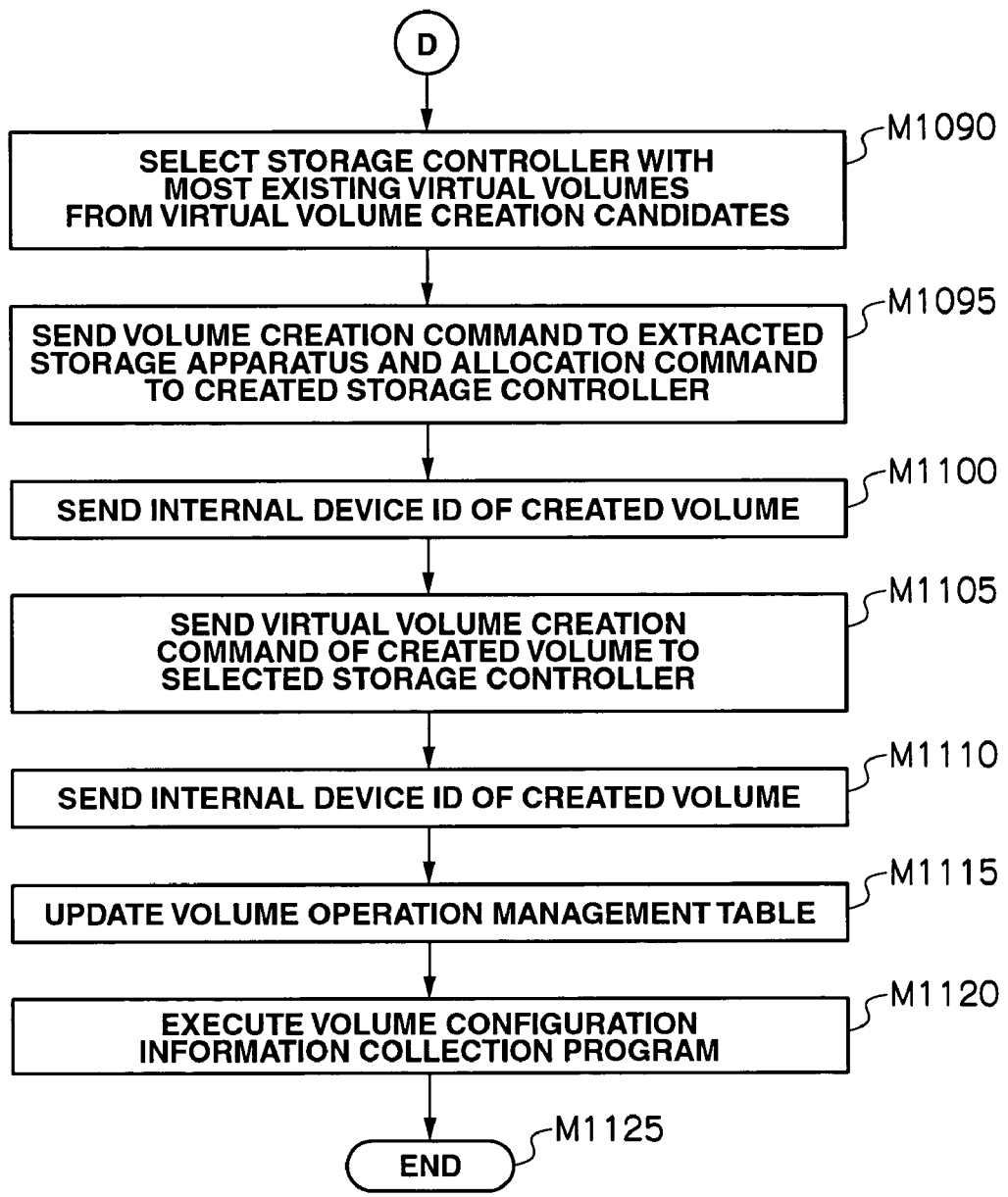
FIG. 40 is a detailed flowchart of the power supply control command program 42150 according to another embodiment of the present invention.

FIG. 38, FIG. 39 and FIG. 40 show the flow when the volume allocation command program 42250 is executed in the volume allocation mode for allocating the volume. Foremost, the management computer 40001 receives a volume 20300 allocation request to the host system 10000 from the business operation administrator 80000 or the storage administrator 90000 (step M1005). Subsequently, the management computer 40001 executes the volume configuration information collection program 42200 (step M1010). The management computer 40001 thereafter acquires the power supply management table 35500 loaded in the apparatus to be managed (step M1015).

Subsequently, the management computer 40001 refers to the power supply management table 35500 and the unallocated storage extent management table 42500 acquired at step M1010, and extracts the storage apparatus 20000 among the storage apparatuses 20000 with the main power supply circuit 36000 turned on in which the capacity of the unallocated storage extent 20400 is largest (step M1020).

The management computer 40001 thereafter checks whether it is possible to create a volume 20300 having a capacity designated by the volume 20300 allocation request received at step M1005 in the storage apparatus 20000 extracted at step M1020 (step M1025). When a volume 20300 cannot be created at step M1025 (step M1025: NO), the management computer 40001 extracts the storage apparatus 20000 with the largest unallocated storage extent 20400 among the storage apparatuses 20000 with the main power supply circuit 36000 turned off (step M1030).

Subsequently, the management computer 40001 checks whether it is possible to create a volume 20300 having a capacity designated by the volume 20300 allocation request received at step M1005 in the storage apparatus 20000 extracted at step M1030 (step M1035). When the management computer 40001 is not able to create a volume 20300 at step M1035 [(step M1035: NO)], it notifies the impossibility of creating a volume 20300 (step M1040), and ends the volume allocation command program 42250.

When the management computer 40001 is able to create a volume 20300 at step M1025 or step M1035 (step M1035: YES; step M1035: YES), it executes step M1045 to step M1065 shown in FIG. 39 to all storage controllers 30000 to be managed (step M1045). Foremost, the management computer 40001 selects a storage controller 30000 that has not been subject to the processing at step M1045 (step M1050). Subsequently, the management computer 40001 checks whether it is possible to allocate the virtual volume 33000 to the host system 10000 designated in the volume 20300 allocation request or whether a controller 32000 handling the virtual volume 33000 of the designated capacity exists in the selected storage controller 30000 (step M1055). When a corresponding storage controller 30000 exists at step M1055 (step M1055: YES), the management computer 40001 makes the selected storage controller 30000 a virtual volume 33000 creation candidate (step M1060).

The management computer 40001 completely subjects the selected storage controller 30000 to the processing at step M1045 (step M1065), returns to step M1045, and then performs similar processing to the other storage controllers 30000. When the processing at step M1045 is performed to all storage controllers 30000, the management computer 40001 checks whether there is a virtual volume 33000 creation candidate (step M1070).

When it is determined at step M1070 that there is no virtual volume 33000 creation candidate (step M1070: NO), the management computer 40001 notifies that it is impossible to create the volume 20300 (step M1075), and ends the volume allocation command program 42250. When it is determined at step M1070 that there is a virtual volume 33000 creation candidate, the management computer 40001 checks whether there is a storage controller 30000 with the main power supply circuit 36000 turned on among the virtual volume 33000 creation candidates (step M1080).

When it is determined at step M1080 that there is a storage controller 30000 with the main power supply circuit 36000 turned on among the virtual volume 33000 creation candidates, the management computer 40001 deletes the storage controller 30000 with the main power supply circuit 36000 turned off from the virtual volume 33000 creation candidate (step M1085). The management computer 40001 thereafter selects the storage controller 30000 with the most number of existing virtual volumes 33000 from the storage controllers 33000 as candidates for creating the virtual volume (step M1090).

Subsequently, the management computer 40001 sends a command to the storage apparatus 20000 extracted at step M1025 to step M1035 for creating a volume 20300 having the capacity designated in the volume 20300 allocation request, and additionally sends a command for allocating the created volume 20300 to the storage controller 30000 selected at step M1090 (step M1095). The management computer 40001 thereafter receives an internal apparatus ID of the created volume 20300 (step M1100). Then, the management computer 40001 sends a command to the storage controller 30000 selected at step M1090 for creating a virtual volume 33000 of the volume 20300 created at step M1095 (step M1105).

Subsequently, the management computer 40001 receives an internal apparatus ID of the created virtual volume 33000 (step M1110). The management computer 40001 thereafter updates the volume operation management table 42700 in order to reflect the received information (step M1115). Finally, the management computer 40001 executes the volume configuration information collection program 42200 (step M1120), and then ends the volume allocation command program 42250 (step M1125). The foregoing is the flow of the volume allocation command program 42250 in the volume allocation mode.

Flow of the allocation release mode for releasing the allocation of the volume 20300 of the volume allocation command program 42250 will now be described. The I/O program 42250 outputs a volume release screen H2500 as shown in FIG. 18, and acquires a volume 20300 release request from the business operation administrator 80000 or the storage administrator 90000. The volume release screen H2500 is configured from a field H2550 for selecting a business ID, a field H2600 for indicating the global volume ID, capacity and the host system 10000 of the volume allocation destination of the volume 20300 used in the selected business, a field H2650 for inputting the global volume ID of the volume 20300 to be released, and a release button H2700.

When the business operation administrator 80000 or the storage administrator 90000 pushes the release button H2700, the management computer 40001 starts the volume allocation command program 42250 in a release mode for releasing the volume 20300. Specifically, foremost, the management computer 40001 receives a volume 20300 release request. Subsequently, the management computer 40001 extracts the value indicated by the global volume ID input to the input field H2650 of the volume release screen H2500 from the volume operation management table 42700.

The management computer 40001 thereafter sends a command to the storage apparatus 30000 indicated with the extracted storage apparatus ID for performing the allocation release from the host system 10000 of the corresponding virtual volume 33000 and deletion of the corresponding virtual volume 33000. Then, the management computer 40001 refers to the volume configuration information table 42600 and sends a command to the storage apparatus 20000 indicated by the value of the real storage information of the corresponding virtual volume 33000 for performing the allocation release of the corresponding volume 20300 and registration in the unallocated storage extent 20400. Finally, the management computer 40001 deletes the requested volume 20300 from the volume operation management table 42700. The management computer 40001 thereafter executes the volume configuration information collection program 42200, and ends the volume allocation command program 42250. The foregoing is the flow of the volume allocation command program 42250 in the case of a volume allocation release mode.

(2-2-3) Volume Migration Command Program

Migration of the volume 20300 between the storage apparatuses 20000 using the volume migration program 35400 of the storage controller 30000 based on the volume migration command program 42350 will now be described. The volume migration command program 42350 is executed by the management computer 40001 based on another program loaded in the management computer 40001 or a command from the management computer 40001. Foremost, the case of migration via copying is described.

In the case of migration via copying, the volume migration command program 42350 receives a parameter for commanding the migration source real volume 20300 and the migration destination storage apparatus 20000 from the storage administrator 90000 or another program loaded in the management computer 40001. After receiving the foregoing parameter, the management computer 40001 extracts the virtual volume 33000 corresponding to the migration source real volume 20300 from the virtual volume management table 42900. Subsequently, the management computer 40001 sends a command to the migration destination storage apparatus 20000 for creating a migration destination real volume 20300. The management computer 40001 thereafter sends a command for allocating the created real volume 20300 to the external port of the storage controller having the migration source virtual volume 33000.

Subsequently, the management computer 40001 sends a command to the storage controller 30000 having the migration source virtual volume 33000 for creating a migration destination virtual volume 33000 corresponding to the created real volume 20300. The management computer 40001 thereafter sends a command to the storage controller 30000 having the migration source virtual volume 33000 for copying the migration source virtual volume 33000 and the migration destination virtual volume 33000.

The storage controller 30000 that received the command executes the volume migration program 35400, and copies the data of the migration destination virtual volume 33000 to the migration source virtual volume 33000. When the management computer 40001 receives a notice from the storage controller 30000 indicating the completion of copying, it foremost sends to the target storage controller 30000 a command for releasing the association of the migration destination virtual volume 33000 and the migration destination real volume 20300, and releasing the association of the migration source virtual volume 33000 and the migration source real volume 20300. Subsequently, [the management computer 40001] sends to the storage controller 30000 a command for associating the migration source virtual volume 33000 with the migration destination real volume 20300, and deleting the migration destination virtual volume 33000. Finally, the management computer 40001 sends a command to the migration source storage apparatus 20000 for registering the migration source real volume 20300 in the unallocated storage extent 20400, and then ends the volume migration command program 42350.

In the case of migration via swapping, the volume migration command program 42350 receives a parameter for commanding the migration source storage apparatus 20000, the migration source real volume 20300, the migration destination storage apparatus 20000 and the migration destination real volume 20300 from the storage administrator 90000 or another program loaded in the management computer 40001.

After receiving the foregoing parameter, the management computer 40001 extracts the virtual volume 33000 of the migration source real volume 20300 and the virtual volume 33000 of the migration destination real volume 20300 from the virtual volume management table 42900. Subsequently, the management computer 40001 sends a command to the storage controller 30000 of the migration source virtual volume 33000 for swapping the migration source virtual volume 33000 and the migration destination virtual volume 33000.

After receiving the swap completion notice from the storage controller 30000, the management computer 40001 thereafter sends to the target storage controller 30000 a command for associating the real volume 20300 of the migration source virtual volume 33000 with the migration destination virtual volume 33000, and a command for associating the real volume 20300 of the migration destination virtual volume 33000 with the migration destination virtual volume 33000, and then ends the volume migration command program 42350.

Figure 41:
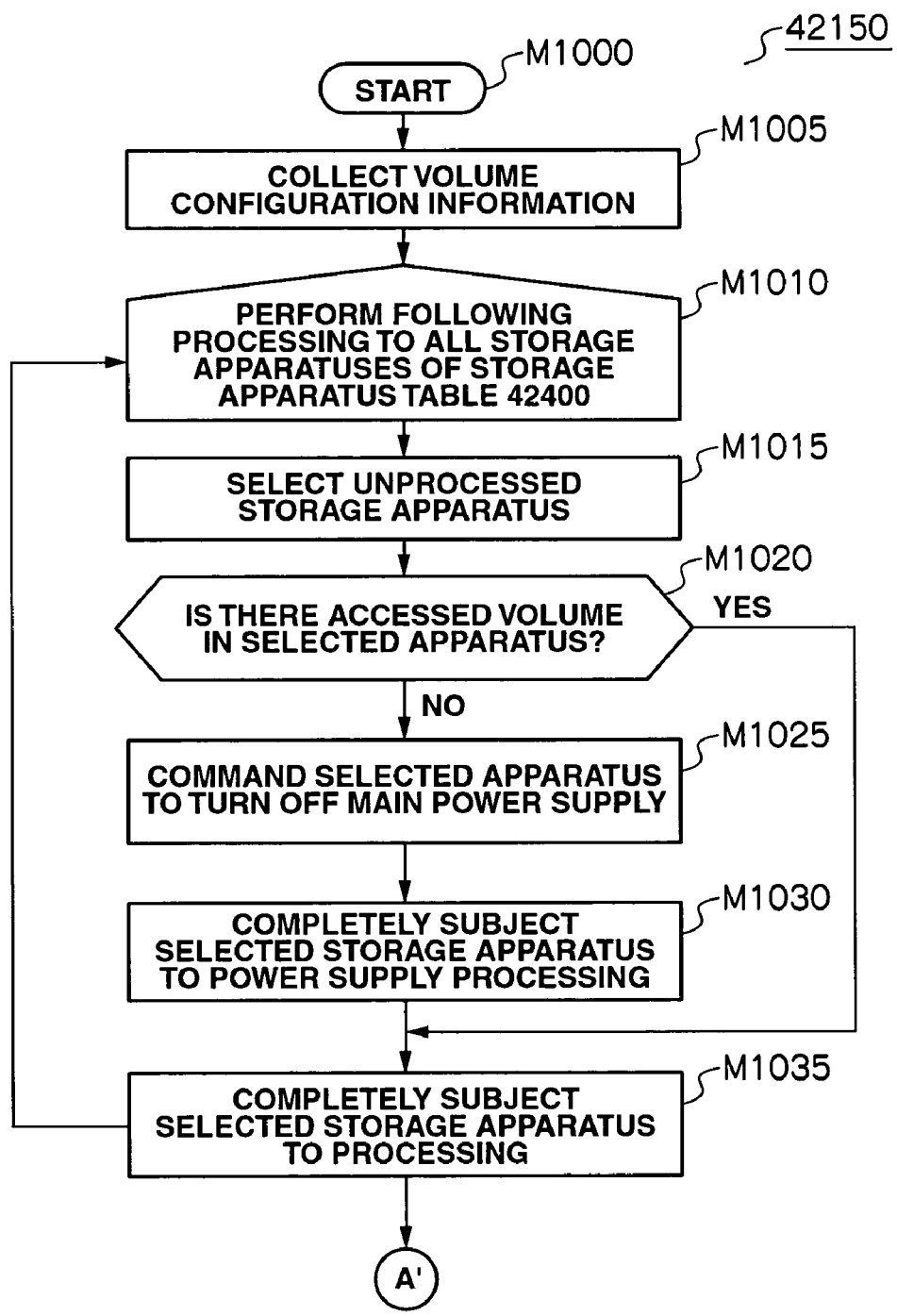
FIG. 41 is a detailed flowchart of the power supply control command program 42150 according to another embodiment of the present invention.

(2-2-4) Power Supply Control Command Program (2-2-4-1) Outline of Power Supply Control Command Program The power supply control command program 42150 is periodically executed by the management computer 40001, or executed by the management computer 40001 based on a command of the storage administrator 90000. Flow of the power supply control command program 42150 will now be described with reference to the flowcharts shown in FIG. 41 to FIG. 43. Foremost, the flow shown in FIG. 41 is described. The management computer 40001 executes the volume configuration information collection program 42200, and updates the volume configuration information table 42600 and the virtual volume management table 42900 (step S1005).

Subsequently, the management computer 40001 executes step S1015 to step S1035 to all apparatuses in the storage apparatus table 42400 (step S1010). The management computer 40001 selects an unprocessed apparatus (step S1015). The management computer 40001 refers to the business operation schedule table 42800, the volume operation management table 42700, the volume configuration information table 42600, and the virtual volume management table 42900, and checks whether the volume 20300 stored in the selected storage apparatus 20000 has been accessed (step S1020). Here, the access status of the volume 20300 is determined based on the operation schedule information created in advance regarding the business and which is retained in the business operation schedule table 42800, and is determined to be accessed if the business using the volume 20300 is in operation, and determined to not be accessed if the business is stopped.

When there is an accessed volume 20300 in the selected storage apparatus 20000 (step S1020: YES), the management computer 40001 proceeds to (step S1020: YES). When there is no accessed volume 20300 at step S1020 (step S1020: NO), the management computer 40001 sends a command to the selected storage apparatus 20000 for turning off the main power supply circuit 36000 (step S1025).

Subsequently, the management computer 40001 completely subjects the selected apparatus to power supply processing (step S1030). The management computer 40001 thereafter completely subjects the selected apparatus to the processing at step S1020 (step S1035). When all corresponding apparatuses are completely subject to the processing at S1020, the management computer 40001 executes the flow shown in FIG. 44. The management computer 40001 executes step S1045 to step S1100 to the storage apparatuses 20000 that have not been completely subject to power supply processing (step S1040). The management computer 40001 selects an unprocessed storage apparatus 20000 from the storage apparatuses 20000 that have not been completely subject to power supply processing, and makes this apparatus A (step S1045). The management computer 40001 executes step S1055 to step S1075 to the storage apparatuses 20000 that have not been completely subject to power supply processing and which are not apparatus A (step S1050). The management computer 40001 selects a storage apparatus that has not been subject to power supply processing, which is not apparatus A, and which has not been subject to the processing at step S1075, and makes this apparatus B (step S1055). The management computer 40001 checks whether it is possible to migrate all accessed volumes 20300 in apparatus A to apparatus B (step S1060).

When all volumes 20300 cannot be copied at step S1060, the management computer 40001 checks whether it is possible to swap all accessed volumes 20300 of apparatus A and the unaccessed volumes 20300 of apparatus B (step S1065). When the volumes 20300 cannot be copied at step S1060, or when swap is possible at step S1065, the management computer 40001 makes apparatus B a migration destination apparatus candidate (step S1070). When swap is not possible at step S1065, or after step S1070, the management computer 40001 completely subjects apparatus B to the processing at step S1050. After the processing at step S1050, the management computer 40001 checks whether it is possible to decide the migration destination apparatus from the migration destination apparatus candidate (step S1080). Here, upon deciding the migration destination apparatus, when the total capacity of the accessed volume 20300 of the migration destination apparatus is greater than the total capacity of the accessed volume 20300 of the apparatus A, and there are several corresponding apparatuses, a condition of using the apparatus with the largest capacity of the unallocated storage extent may also be adopted.

If it is not possible to decide the migration destination apparatus at step S1060, the management computer 40001 executes step S1100. If the migration destination apparatus is decided at step S1060, the management computer 40001 executes the volume migration command program 42350 so as to migrate all accessed volumes 20300 of apparatus A to the migration destination apparatus (step S1085).

Subsequently, the management computer 40001 sends a command to apparatus A for turning off the main power supply circuit 36000 (step S1090). The management computer 40001 thereafter completely subjects apparatus A to power supply processing (step S1095). Then, the management computer 40001 completely subjects apparatus A to the processing at step S1050 (step S1100). When all corresponding storage apparatuses 20000 are completely subject to the processing at step S1050, the management computer 40001 executes the flow shown in FIG. 43. The management computer 40001 executes step S1110 to step S1150 to the storage apparatus 20000 that have not been completely subject to power supply processing (step S1105). The management computer 40001 selects an unprocessed storage apparatus 20000 (step S1110). The management computer 40001 thereafter extracts a volume configuration management table 20530 from the selected storage apparatus 20000 (step S1115).

Subsequently, the management computer 40001 extracts a disk management table 20540 from the selected storage apparatus 20000 (step S1120). The management computer 40001 thereafter extracts a power supply management table 20550 from the selected storage apparatus 20000 (step S1125). Then, the management computer 40001 commands the selected storage apparatus 20000 to turn off the power supply of disks other than those configuring the accessed volume 20300 (S1130). Specifically, the management computer 40001 refers to the power supply management table 20550, the volume operation management table 42700, and the business operation schedule table 42800 extracted at step S1115, step S1120 and step S1125, selects disks other than those configuring the accessed volume 20300, and sends a command to the selected storage apparatus 20000 for turning off the power supply of the corresponding disks.

Subsequently, the management computer 40001 commands the selected storage apparatus 20000 to turn off the power supply of the controller 32000 that does not have the accessed volume 20300 (step S1130). Specifically, the management computer 40001 refers to the respective tables extracted at step S1100 and step S1120, the volume operation management table 42700 and the business operation schedule table 42800, selects the controller 32000 that does not have the accessed volume 20300, and sends a command to the selected storage apparatus 20000 for turning off the power supply of the corresponding controller 32000 (step S1135).

The management computer 40001 thereafter completely subjects the selected storage apparatus 20000 to power supply processing (step S1140). After performing the processing at step S1105 to all corresponding storage apparatuses 20000, the management computer 40001 executes the flow shown in FIG. 44.

The management computer 40001 executes step S1145 to step S1180 to the storage controllers 30000 that have not been completely subject to power supply processing (step S1145).

The management computer 40001 selects an unprocessed storage controller 30000 (step S155). The management computer 40001 extracts the virtual volume configuration management table 25300 from the selected storage controller 30000 (step S1160).

Subsequently, the management computer 40001 extracts a power supply management table 35500 from the selected storage controller 30000 (step S1165). The management computer 40001 thereafter commands the selected storage controller 30000 to turn off the power supply of the external connection port 39000 other than the external connection ports not allocated with the real volume 20300 of the accessed virtual volume 33000 (step S1170). The management computer 40001 thereafter commands the selected storage controller 30000 to turn off the power supply of the controller 32000 not having the accessed virtual volume 33000 (step S1175). Then, the management computer 40001 completely subjects the storage controller 30000 to power supply processing. When all corresponding storage controllers 30000 are completely subject to the processing at step S1145 (step S1180), the management computer 40001 ends the power supply control command program 42150 (step S1185).

(2-2-4-2) Explanation of Specific Power Supply Control Command Program

Figure 42:
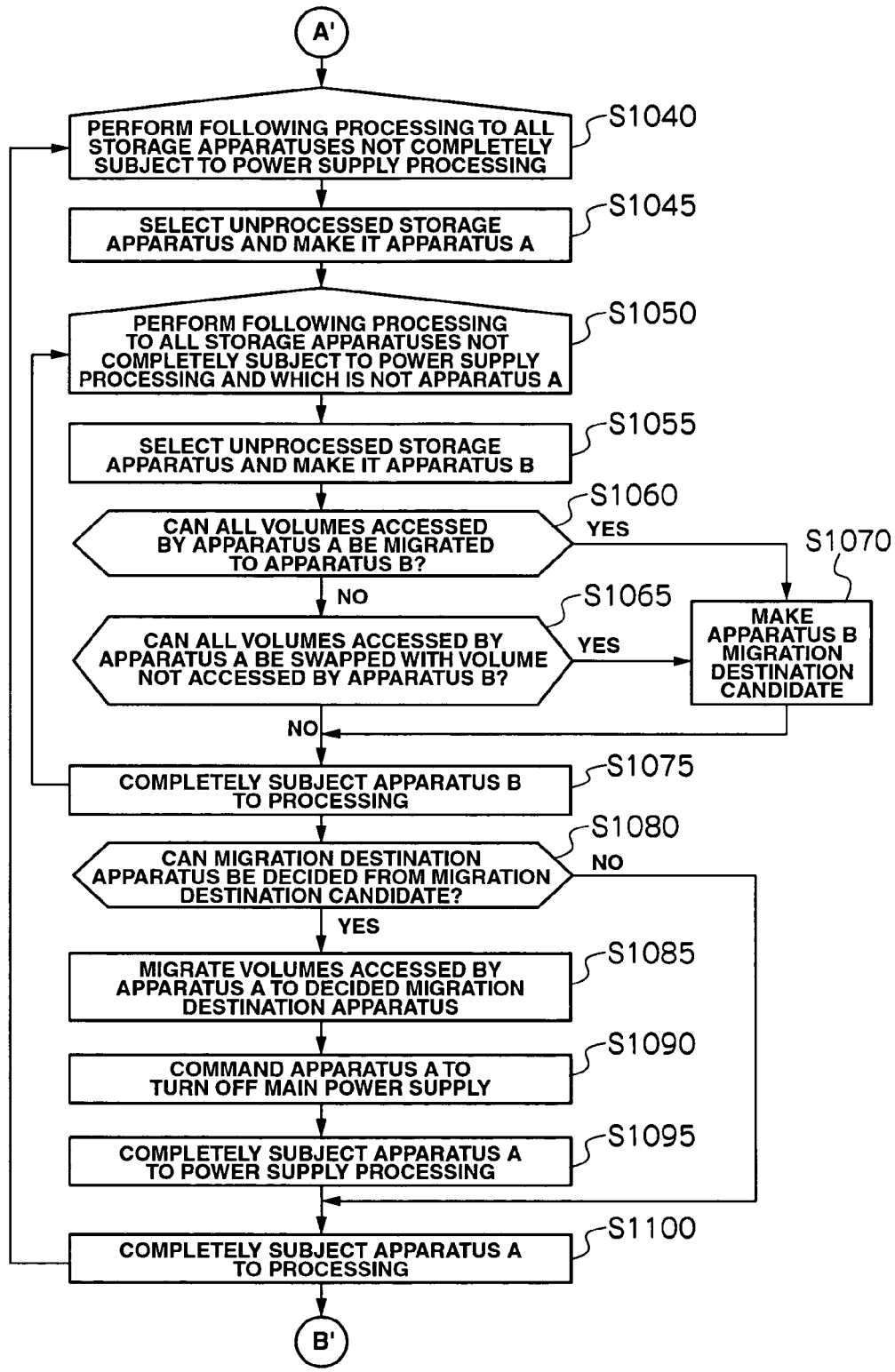
FIG. 42 is a detailed flowchart of the power supply control command program 42150 according to another embodiment of the present invention.
Figure 43:
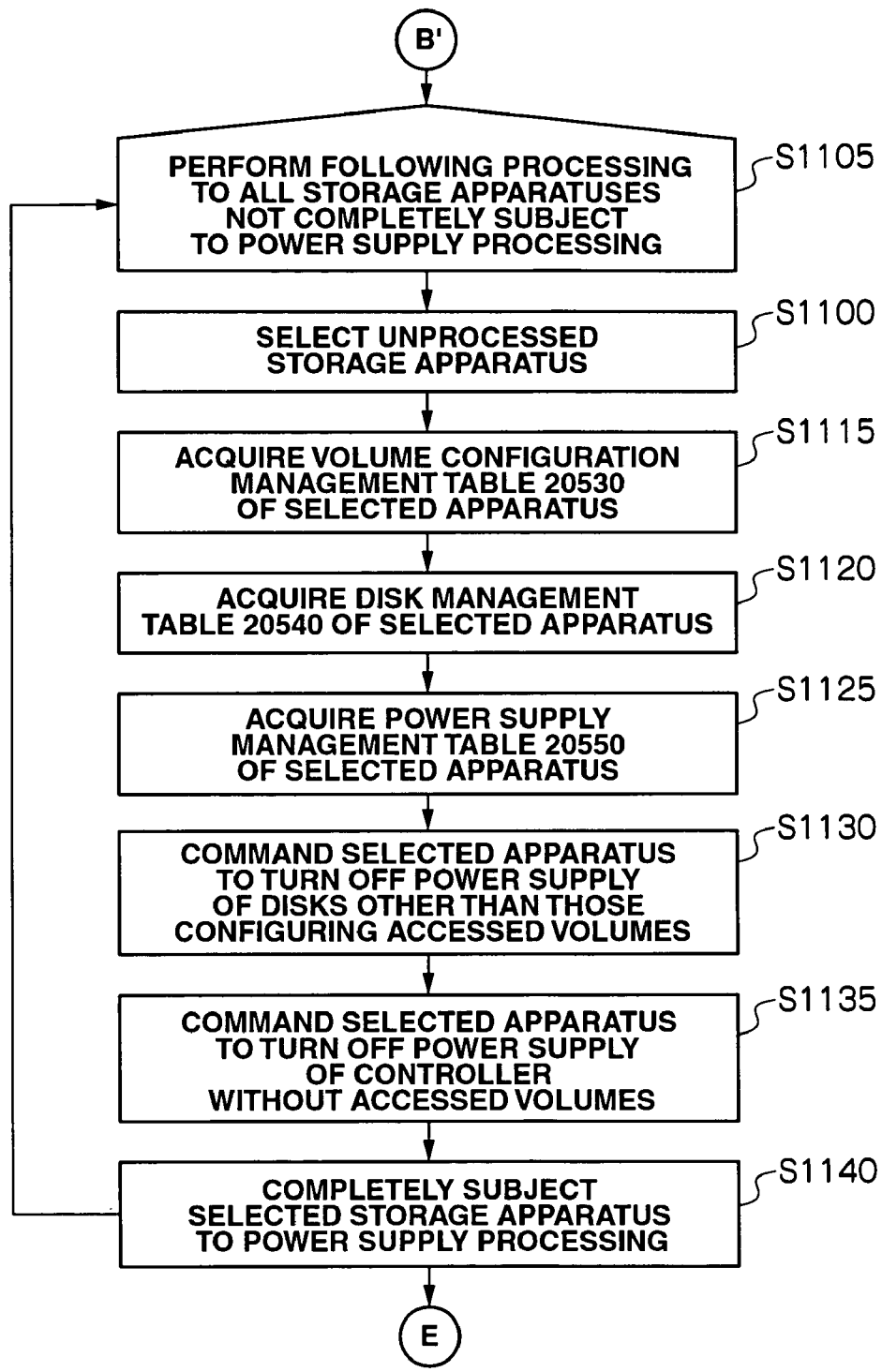
FIG. 43 is a detailed flowchart of the power supply control command program 42150 according to another embodiment of the present invention.
Figure 44:
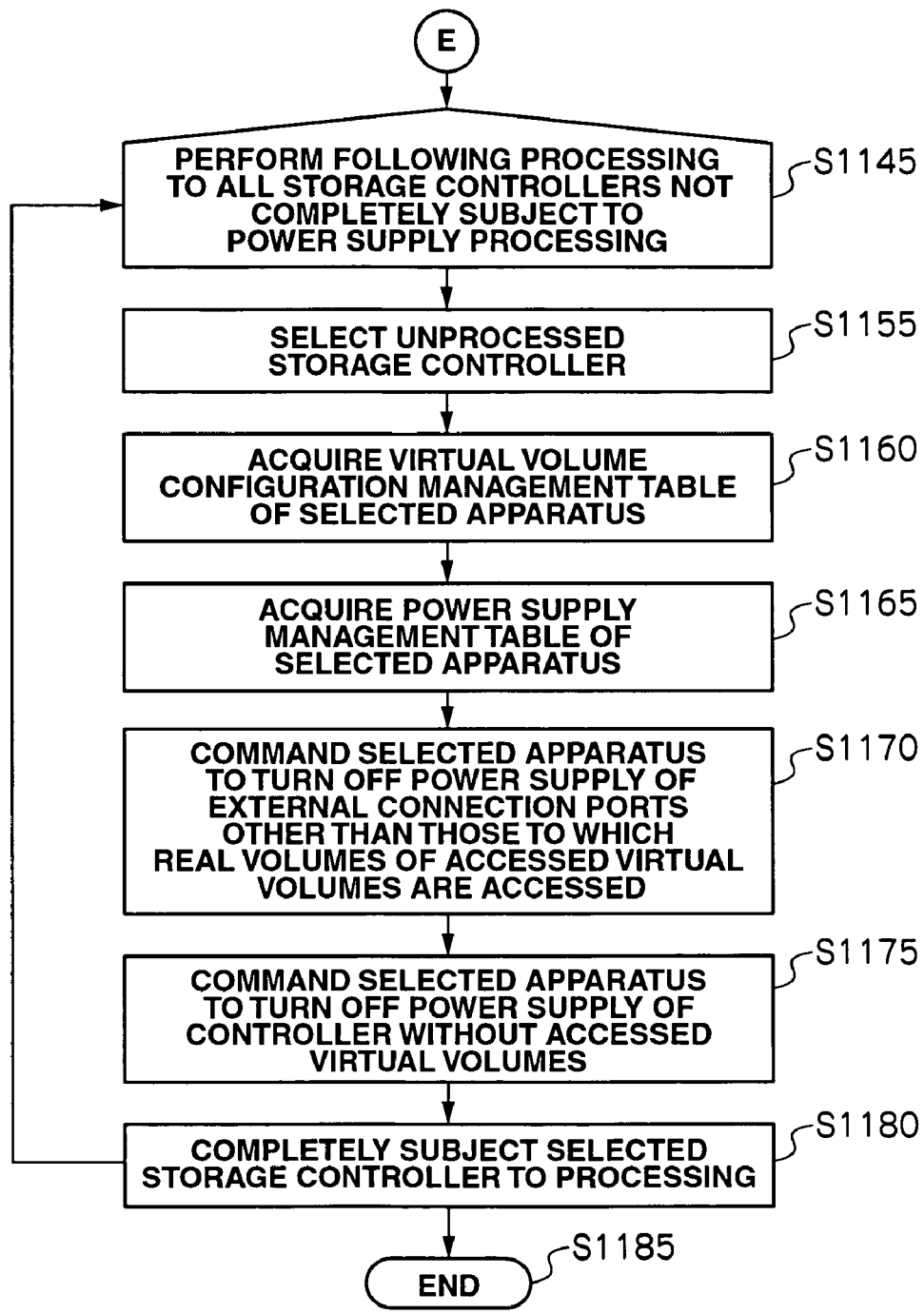
FIG. 44 is a detailed flowchart of the power supply control command program 42150 according to another embodiment of the present invention.

A specific example of the power supply control command program 42150 in the present embodiment will now be described in further detail based on the flow shown in FIG. 42 and FIG. 43. The configuration of the storage system in this embodiment shall be the configuration shown in FIG. 29, and the respective tables loaded in the management computer 40001 before the execution of the all main power supply circuits 20700 of the storage apparatuses 20000 before the execution of the power supply control command program 42150 shall be as shown in FIG. 34 to FIG. 37, and FIG. 14. Further, all main power supply circuits 36000 of the storage apparatuses 20000 before the execution of the power supply control command program 42150 shall be turned on, and the management computer 40001 executes the power supply control based on this schedule information upon referring to the information after one day of the business operation schedule shown in FIG. 14. Here, the virtual volume 33000 of the storage controller 30000, the real storage information, the global storage ID, and the access status of the volume 20300 based on the business are shown in FIG. 45A, and the main power supply circuit status of the storage apparatus 20000 and the storage controller 30000 is shown in FIG. 45B.

Foremost, processing from step S1000 to step S1035 is described. In the present embodiment, when referring to FIG. 45A, only the storage apparatus ST1 is storing an unaccessed volume 20300. Thus, the management computer 40001 sends a command to the storage apparatus ST1 for turning off the main power supply circuit 36000 (step S1025).

Processing from step S1040 to step S1100 will now be described. Foremost, the management computer 40001 selects the storage apparatus ST2 as the storage apparatus 20000 that has not been subject to power supply processing (step S1045). The total capacity of the unaccessed volume 20300 of the storage apparatus ST2 is 20 GB. Thus, as a result of performing the processing from step S1050 to step S1075, the storage apparatus ST3 and the storage apparatus ST4 become the migration destination apparatus candidates of the accessed volume 20300 of the storage apparatus ST2.

Subsequently, the management computer 40001 checks whether it is possible to decide the migration destination using the condition of making an apparatus having the largest capacity of the unallocated storage apparatus when the total capacity of the accessed volume 20300 of the migration destination apparatus is greater than the total capacity of the accessed volume 20300 of the storage apparatus ST2 and when there are several corresponding apparatuses at step S1080 as such migration destination (step S1080), the migration destination apparatus will be the storage apparatus ST4. The management computer 40001 thereafter migrates, at step S1085, the accessed volume VOL2 of the migration source apparatus (ST2) to the migration destination apparatus (ST4) (step S1085). Specifically, provides a parameter to the volume migration command program 42350 for copying the [volume] VOL2 as the migration source real volume 20300, and copying the storage apparatus ST4 as the migration destination storage apparatus 20000 to a migration means.

Subsequently, the management computer 40001, at step S1090, sends a command to the storage apparatus ST2 for turning off the main power supply circuit 36000. The management computer 40001 thereafter completely subjects the storage apparatus ST2 to power supply processing at step S1095, and further completely subjects the storage apparatus ST2 to power supply processing at step S1100, and then returns to step S1040. Then, the management computer 40001, at step S1045, selects a storage apparatus 20000 that has not been subject to power supply processing or the processing at step S1040 as the storage apparatus ST3. In the processing from step S1050 to step S1075, the storage apparatus ST4 is extracted as the migration destination apparatus candidate. At step S1080, because the storage apparatus ST4 is the only migration destination apparatus candidate, the storage apparatus ST4 becomes the migration destination apparatus.

Subsequently, the management computer 40001, at step S1085, migrates the accessed volume VOL5 of the migration source apparatus (ST3) to the migration destination apparatus (ST4). Specifically, the [management computer 40001] provides a parameter to the volume migration command program 42350 for commanding the copy of the [volume] VOL5 as the migration source real volume 20300, and the storage apparatus ST4 as the migration destination storage apparatus 20000 to a migration means. The management computer 40001 thereafter sends a command to the storage apparatus ST3 for turning off the main power supply circuit 36000 at step S1090. Then, at step S1095, the [management computer 40001] completely subjects the storage apparatus ST2 to power supply processing, and, further at step S1100, completely subjects the storage apparatus ST2 to the processing at step S1040, and then returns to step S1040.

The management computer 40001, at step S1045, selects the storage apparatus ST4 as the storage apparatus 20000 that has not been completely subject to power supply processing or the processing at step S1040. Subsequently, in the processing from step S1050 to step S1075, because there is no storage apparatus 20000 that has not been subject to power supply processing, there will be no migration destination candidate. Thus, because it is not possible to decide the migration destination candidate at step S1080, the routine proceeds to step S1095.

At step S1095, the [management computer 40001] completely subjects the storage apparatus ST4 to the processing at step S1040, and then returns to step S1040. At step S1040, because there is no storage apparatus 20000 that has not been subject to power supply processing or the processing at step S1040, the management computer 40001 proceeds to step S1150. The virtual volume 33000 of the storage controller 30000 after the processing heretofore, real storage information including the apparatus ID and the internal apparatus volume ID, the global storage ID, and the access status of the volume 20300 based on the business are shown in FIG. 46A, and the status of the main power supply circuit of the storage apparatus 20000 and the storage controller 30000 is shown in FIG. 46B.

Subsequently, the management computer 40001 executes the power supply control command of the internal components of the storage apparatus 20000 from step S1105 to step S1140. Foremost, the management computer 40001 selects the storage apparatus ST4 that has not been subject to power supply processing (step S1110). The management computer 40001 thereafter acquires a volume configuration management table 20530 of the storage apparatus ST4 (step S1115). The results are shown in FIG. 24. Then, the management computer 40001 acquires a disk management table 20540 of the storage apparatus ST4 (step S1120). The results are shown in FIG. 25. The management computer 40001 thereafter acquires a power supply management table 35500 of the storage apparatus ST4 (step S1125). The results are shown in FIG. 24.

The management computer 40001 commands the storage apparatus ST4 to turn off the power supply of the DISK005, the DISK006 and the DISK007 (step S1130). At step S1135, because there is no corresponding controller 30200 in the storage apparatus ST4, a power supply command is not given. The management computer 40001 completely subjects the storage apparatus ST4 to power supply processing (step S1140). After returning to step S1105, because there is no storage apparatus 20000 that has not been subject to power supply processing, the routine proceeds to step S1145.

Subsequently, the management computer 40001 executes the power supply control command of the components in the apparatus of the storage controller 30000 configured from step S1145 to step S1180. Foremost, at step S1155, the [management computer 40001] selects the storage controller SC1 that has not been completely subject to power supply processing. The management computer 40001, at step S1160, acquires the virtual volume configuration management table 35300 of the storage controller SC1 (FIG. 47A), and, at step S1165, acquires the power supply management table 35500 of the storage controller SC1 (FIG. 47B).

The management computer 40001, at step S1170, sends a command to the storage controller SC1 for turning off the power supply of the external connection port 39000 PORT0 to which only the accessed real volume 20300 is allocated. The management computer 40001, at step S1175, does not send a power supply control command of the controller 32000 because there is no controller 32000 having only an unaccessed virtual volume 33000. At step S1180, the [management computer 40001] completely subjects the storage 32000 controller SC1 to power supply processing, and then returns to step S1145.

The management computer 40001, at step S1155, selects the storage controller SC2 that has not been completely subject to power supply processing. Subsequently, the management computer 40001, at step S1160, acquires a virtual volume configuration management table 35300 of the storage controller SC2 (FIG. 48A), and, at step S1165, acquires a power supply management table 35500 of the storage controller SC2 (FIG. 48B).

The management computer 40001, at step S1170, sends a command to the storage controller SC2 for turning off the power supply of the external connection port PORT0 to which only an unaccessed real volume 20300 is allocated. The management computer 40001, at step S1175, does not send a power supply control command of the controller 32000 because there is no controller 32000 with only an unaccessed virtual volume 33000. At step S1180, the [management computer 40001] completely subjects the storage controller SC2 to power supply processing, and then returns to step S1145. The management computer 40001, at step S1145, ends the power supply control command program 42150 because there is no storage controller 30000 that has not been completely subject to power supply processing.

The foregoing is a specific example of the power supply control command program 42150 according to the present embodiment.

(3) Effect of Present Embodiment

According to the present embodiment, even when using the virtual volume 33000, by migrating the real volume 20300 associated with the virtual volume 33000, the power supply to the main power supply circuit 36000 of the storage apparatus 20000 can be stopped. Thus, the present invention is able to achieve the effect of realizing the power saving of the overall storage system. In addition, because it is possible to stop the power supply to the main power supply circuit 36000 of the storage apparatus 20000 based on the operation schedule information created in advance in relation to the business to be conducted by the host system 10000, the present invention is able to achieve the effect of realizing the power saving of the overall storage system.

(4) Other Embodiments

In the foregoing embodiments, although a case was described for providing a physical storage extent using a storage medium such as a hard disk, the present invention is not limited thereto, and a semiconductor memory such as a flash memory may be used as the storage device. In addition, one storage apparatus may function as the management computer.

What is claimed is:

1. A storage system, comprising:
one or more host systems;
a plurality of storage apparatuses in which each storage apparatus comprises a plurality of storage devices and is operable to use said storage device to provide said one or more host systems with a storage extent accessible by said one or more host systems; and
a management apparatus operable to manage said storage apparatuses, wherein said management apparatus includes information concerning the access schedule where said host system accessed said storage extent, and, based on said schedule information, said management apparatus is further operable to migrate to a second storage apparatus a storage extent of a first storage apparatus having said storage extent to be accessed by said host system, create a period in which said first storage apparatus does not have said storage extent to be accessed by said host system, and turn off a main power supply of said first storage apparatus during said period,
wherein said schedule information comprises information concerning the schedule for operating one or more businesses provided by said host system to a user and information defining the access destination storage extent of data required by said host system to execute said businesses, and
wherein a migration destination in said second storage apparatus is selected from among said plurality of storage apparatuses with the power supply turned on.

2. The storage system according to claim 1, wherein said management apparatus is operable to turn on a standby power supply during the period when the main power supply of said first storage apparatus is turned off.

3. The storage system according to claim 1, wherein said management apparatus is operable to give preference to a storage apparatus with its main power supply turned on, and set a storage extent to be accessed by said one or more host systems in said storage apparatus.

4. The storage system according to claim 1 or claim 3, wherein said management apparatus is operable to define said first storage apparatus and said second storage apparatus such that a storage apparatus among the plurality of storage apparatuses configuring said storage system that is accessed by said one or more host systems and having a larger total capacity becomes said second storage apparatus, and another storage apparatus with a smaller capacity becomes said first storage apparatus.

5. The storage system according to claim 1, wherein a main power supply of a storage apparatus, having only the access destination storage extent of data required by said one or more host systems to execute said businesses, is turned off during the period when said businesses are not operated.

6. The storage system according to claim 1, wherein said management apparatus is operable to select a storage apparatus to become said second storage apparatus among the storage apparatuses with a main power supply turned on, and migrate the storage extent of said first storage apparatus that is accessed from said one or more host systems to a storage extent of said second storage apparatus to which access from said one or more host systems is undecided.

7. The storage system according to claim 1, wherein said management apparatus is operable to select a storage apparatus to become said second storage apparatus among the storage apparatuses with a main power supply turned on, and swaps a storage extent of said second storage apparatus that is not accessed from said one or more host systems and a storage extent of said first storage apparatus that is accessed from said one or more host systems.

8. The storage system according to claim 1, wherein said management apparatus is operable to turn off a power supply of a storage device configuring storage extents, other than storage extents of the storage apparatuses with a main power supply turned on that are accessed from said one or more host systems, and a control circuit of said storage device.

9. A storage system, comprising:
a host system;
a first storage apparatus connected to said host system;
a second storage apparatus connected to said first storage apparatus; and
a management apparatus connected to said first storage apparatus and said second storage apparatus;
wherein said management apparatus includes information concerning the operation schedule of businesses which require a use of storage extent of said first storage apparatus by said host system, said management apparatus being operable to turn off the main power supply of said first storage apparatus that is not storing said extent subject to the operation of said businesses based on said operation schedule;
wherein said schedule information comprises information concerning the schedule for operating one or more businesses provided by the host system to a user and information defining the access destination storage extent of data required by said host system to execute said businesses, and
wherein a migration destination in said second storage apparatus is selected from among a plurality of storage apparatuses with the power supply turned on.

10. The storage system according to claim 9, wherein said management apparatus includes information regarding the connection relation of the storage extent of said second storage apparatus and the storage extent of said first storage apparatus, and is operable to extract information concerning a schedule for using the storage extent of said first and second storage apparatuses from the information concerning said operation schedule based said connection relation.

11. The storage system according to claim 9, wherein said management apparatus is operable to acquire information concerning said connection relation from said first storage system.

12. The storage system according to claim 9, wherein said management apparatus, based on information concerning said connection relation and information concerning said operation schedule, is operable to turn off the main power supply of a storage apparatus among the storage apparatuses corresponding to said second storage apparatus that is not storing the storage extent accessed by said host system during the operation of said businesses.

13. The storage system according to claim 9, wherein said management apparatus, based on information concerning said connection relation and information concerning said operation schedule, is operable to migrate the storage extent of one storage apparatus corresponding to said first storage apparatus that is accessed by said host system during the operation of said businesses to another storage apparatus corresponding to said first storage apparatus, and is further operable to turn off the main power supply of said one storage apparatus.

14. The storage system according to claim 9 or claim 13, wherein said management apparatus, based on information concerning said connection relation and information concerning said operation schedule, is operable to migrate the storage extent of one storage apparatus corresponding to said second storage apparatus that is accessed by said host system during the operation of said businesses to another storage apparatus corresponding to said second storage apparatus, and is further operable to turn off the main power supply of said one storage apparatus.

15. The storage system according to claim 14, wherein said management apparatus is operable to command said first storage apparatus to delete said connection information including the storage extent of the second storage apparatus with the main power supply turned off.

16. A storage system, comprising:
one or more host systems;
a plurality of storage apparatuses in which each storage apparatus has a plurality of storage devices and is operable to use said storage devices to provide said one or more host systems with a storage extent accessible by said one or more host systems; and
a management apparatus operable to manage said storage apparatuses, wherein said management apparatus includes information concerning the access schedule where said host system accessed said storage extent, and, based on said schedule information, said management apparatus is further operable to migrate a storage extent of a first storage apparatus having said storage extent to be accessed by said one or more host systems to a second storage apparatus, and turn off the main power supply of said first storage apparatus when said first storage apparatus no longer has said storage extent to be accessed by said one or more host systems,
wherein said schedule information comprises information concerning the schedule for operating one or more businesses provided by said one or more host systems to a user and information defining the access destination storage extent of data required by said one or more host systems to execute said businesses, and wherein a migration destination in said second storage apparatus is selected from among said plurality of storage apparatuses with the power supply turned on.

17. A management apparatus of a storage system, comprising:

one or more host systems; and a plurality of storage apparatuses in which each storage apparatus has a plurality of storage devices and is operable to use said storage device to provide said one or more host systems with a storage extent accessible by said one or more host systems;

wherein said management apparatus includes information concerning the access schedule where said one or more host systems accessed said storage extent, and, based on said schedule information, said management apparatus is operable to migrate to a second storage apparatus a storage extent of a first storage apparatus having said storage extent to be accessed by said one or more host systems, create a period in which said first storage apparatus does not have said storage extent to be accessed by said one or more host systems, and turn off the main power supply of said first storage apparatus during said period, wherein said schedule information comprises information concerning the schedule for operating one or more businesses provided by said one or more host systems to a user and information defining the access destination storage extent of data required by said one or more host systems to execute said businesses, and wherein a migration destination in said second storage apparatus is selected from among said plurality of storage apparatuses with the power supply turned on.

* * * * *